United States Patent
Lee et al.

(10) Patent No.: US 10,375,725 B2
(45) Date of Patent: Aug. 6, 2019

(54) METHOD OF FAST-RETRANSMITTING UPLINK DATA IN WIRELESS COMMUNICATION SYSTEM AND APPARATUS THEREFOR

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/549,652

(22) PCT Filed: Sep. 25, 2015

(86) PCT No.: PCT/KR2015/010170
§ 371 (c)(1),
(2) Date: Aug. 8, 2017

(87) PCT Pub. No.: WO2016/148358
PCT Pub. Date: Sep. 22, 2016

(65) Prior Publication Data
US 2018/0049234 A1    Feb. 15, 2018

Related U.S. Application Data

(60) Provisional application No. 62/133,480, filed on Mar. 16, 2015.

(51) Int. Cl.
*H04W 72/14* (2009.01)
*H04L 1/18* (2006.01)
(Continued)

(52) U.S. Cl.
CPC .............. *H04W 72/14* (2013.01); *H04L 1/18* (2013.01); *H04W 28/04* (2013.01); *H04W 72/1268* (2013.01)

(58) Field of Classification Search
None
See application file for complete search history.

(56) References Cited

U.S. PATENT DOCUMENTS

2013/0033979 A1    2/2013  Taoka et al.
2014/0126492 A1*   5/2014  Gleixner ................. H04W 4/70
                                                    370/329
(Continued)

FOREIGN PATENT DOCUMENTS

KR    1020110061507    6/2011
KR    1020120132911    12/2012
WO    2012023819      2/2012

OTHER PUBLICATIONS

PCT International Application No. PCT/KR2015/010170, International Search Report dated Jan. 15, 2016, 2 pages.

(Continued)

*Primary Examiner* — Kibrom T Hailu
(74) *Attorney, Agent, or Firm* — Lee, Hong, Degerman, Kang & Waimey

(57) ABSTRACT

The present application relates to a method performed by a terminal for transmitting uplink data (UL data) in a wireless communication system supporting a low latency service, the method comprising the steps of: receiving a UL grant for transmitting initial data from a base station; transmitting the initial data to the base station on the basis of the received UL grant; receiving, from the base station, non-acknowledgement (NACK) for the transmission of the initial data and a simple UL grant comprising resource information related to the retransmission of the initial data; and performing the (Continued)

retransmission of the initial data on the basis of the received simple UL grant.

13 Claims, 20 Drawing Sheets

(51) Int. Cl.
*H04W 28/04* (2009.01)
*H04W 72/12* (2009.01)

(56) References Cited

U.S. PATENT DOCUMENTS

| | | | |
|---|---|---|---|
| 2015/0098432 A1* | 4/2015 | Han | H04B 7/0426 |
| | | | 370/329 |
| 2015/0139155 A1* | 5/2015 | Wang | H04L 1/1812 |
| | | | 370/329 |
| 2016/0219627 A1* | 7/2016 | Au | H04W 74/0841 |
| 2017/0126452 A1* | 5/2017 | Sandberg | H04L 27/2613 |

OTHER PUBLICATIONS

LG Electronics, "UE-specific Search Space Design for Cross-Carver Scheduling", R1-103957, 3GPP TSG RAN WG1 Meeting #61bis, Jul. 2010, 10 pages.

* cited by examiner

【FIG. 1】
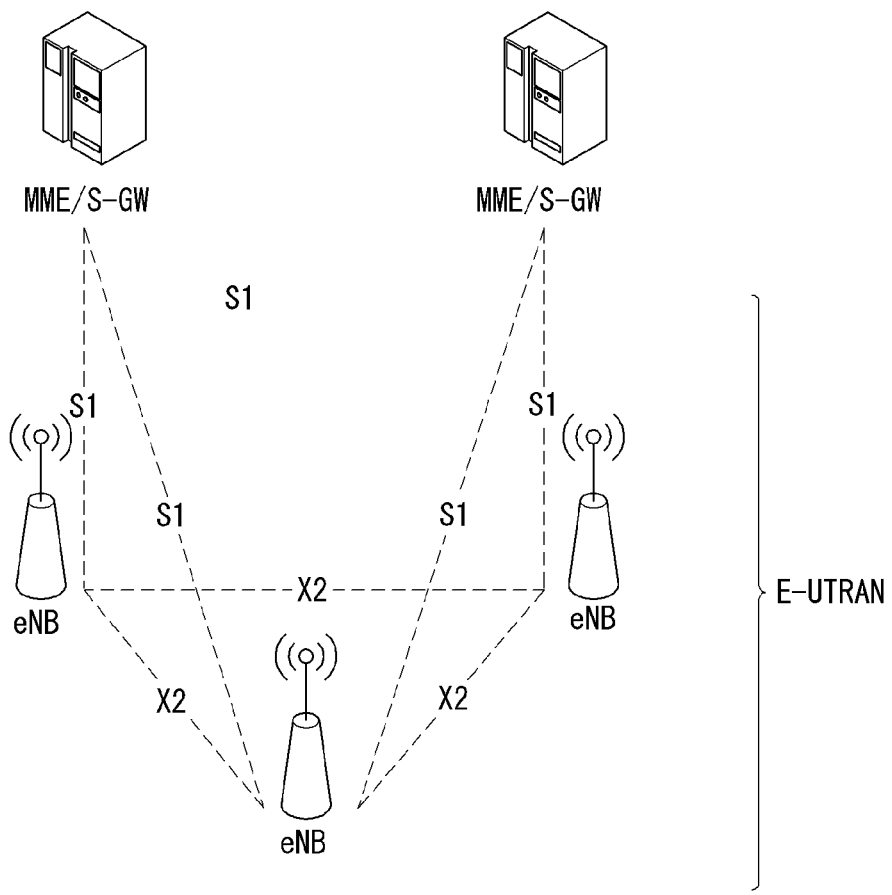

[FIG. 2]
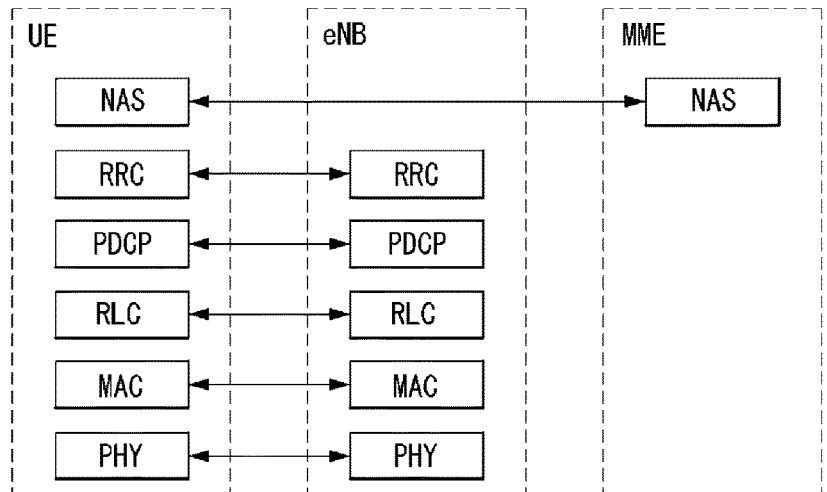
(a) Control plane protocol stack
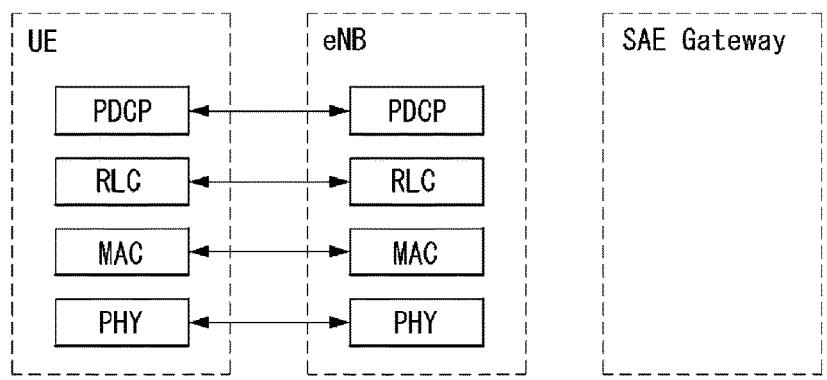
(b) User plane protocol stack
[FIG. 3]
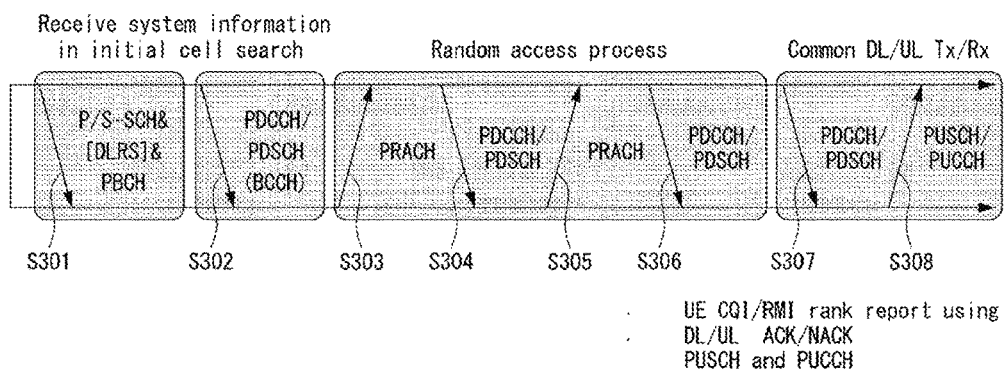

[FIG. 4]
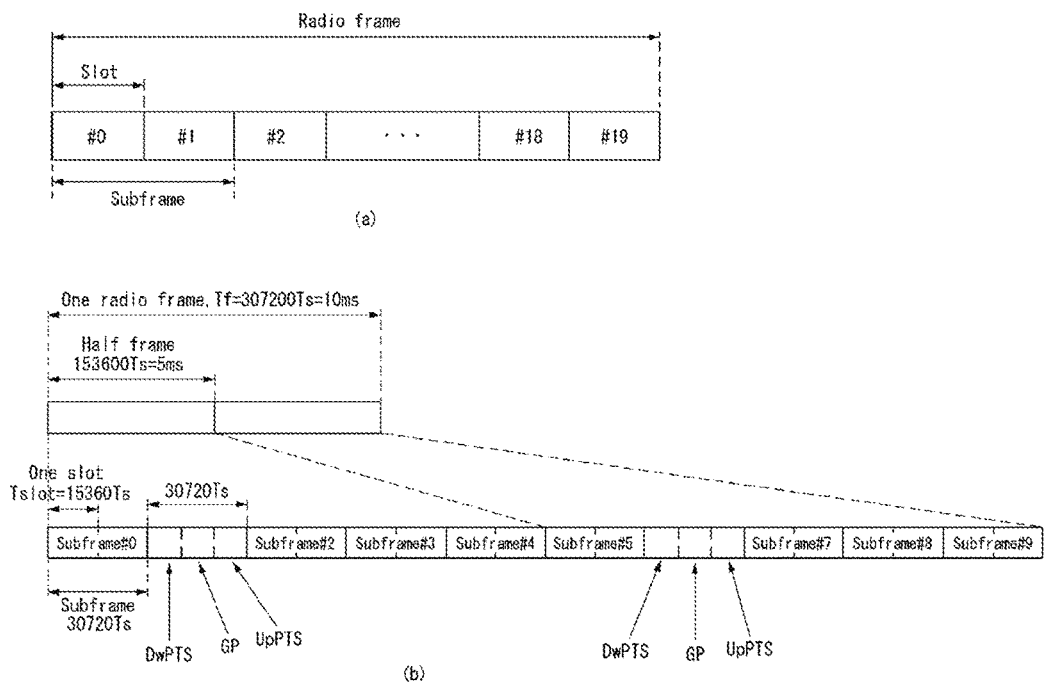

[FIG. 5]
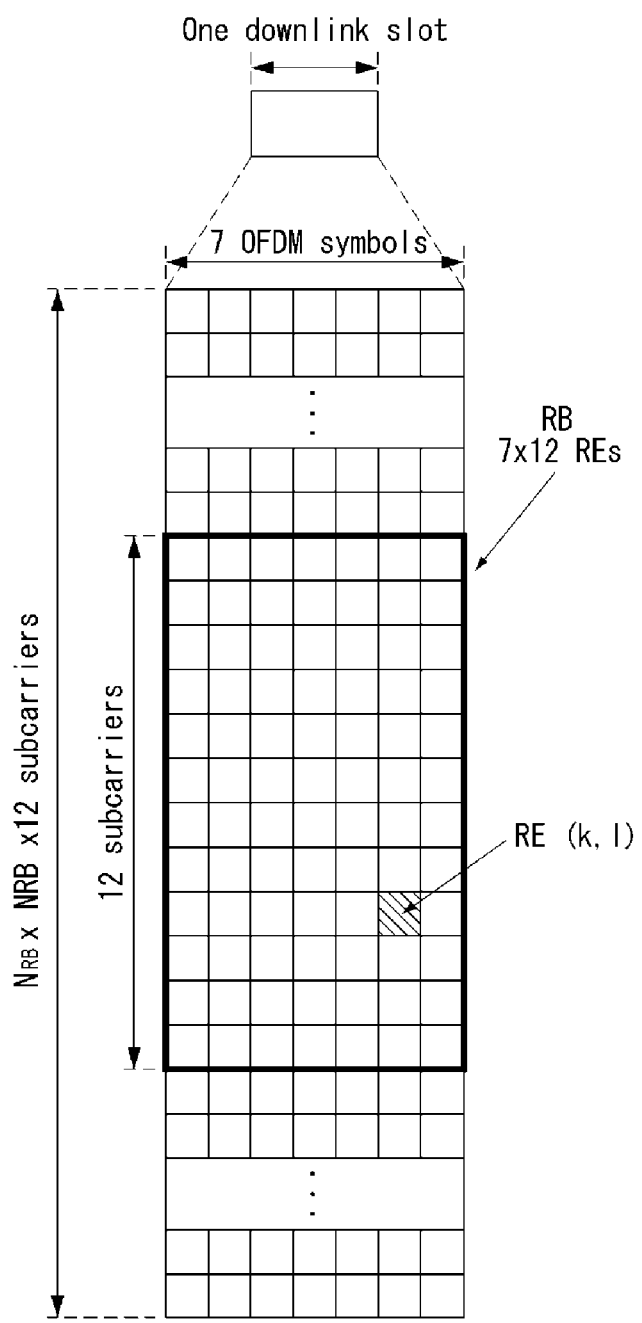

[FIG. 6]
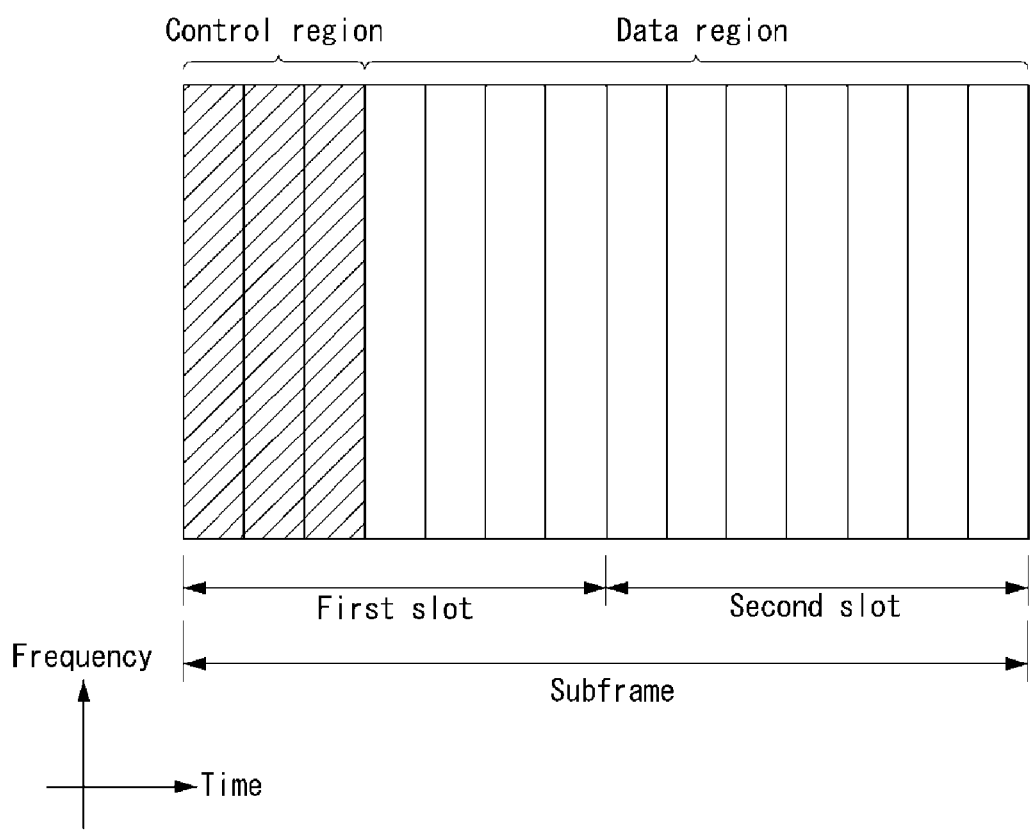

[FIG. 7]
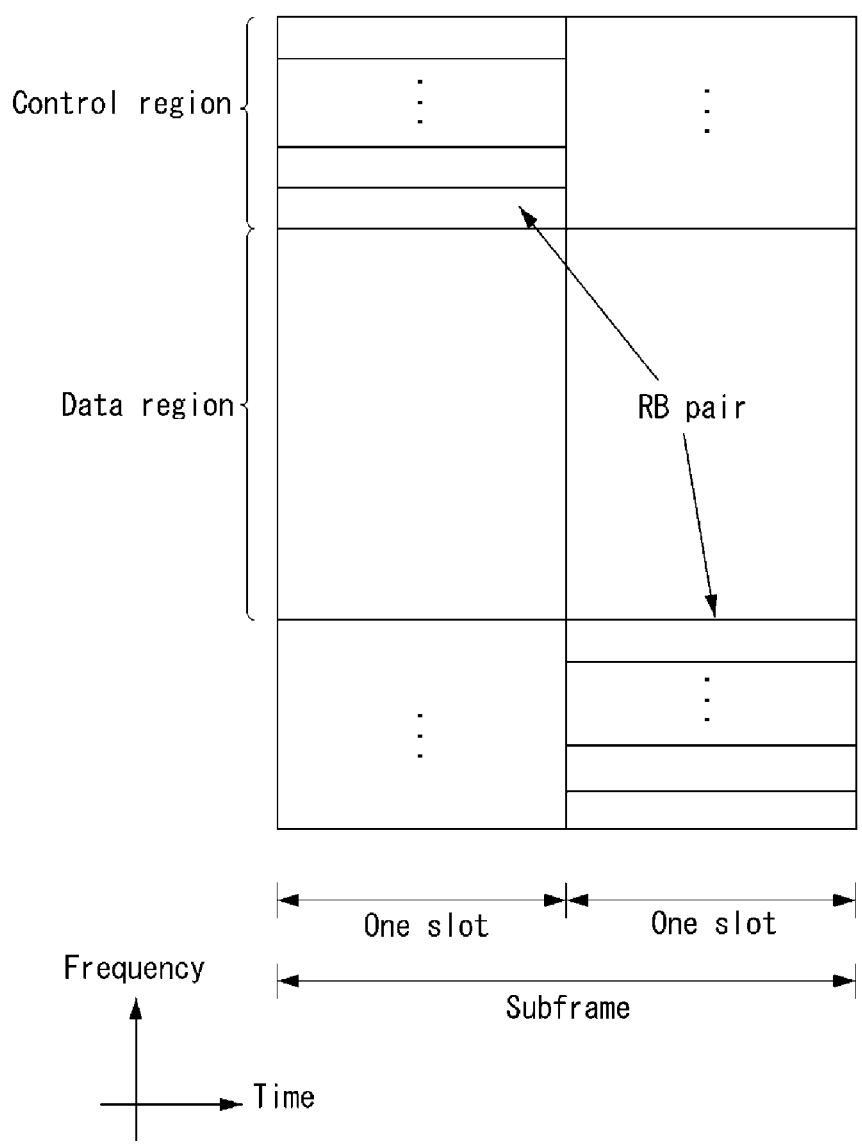

[FIG. 8]
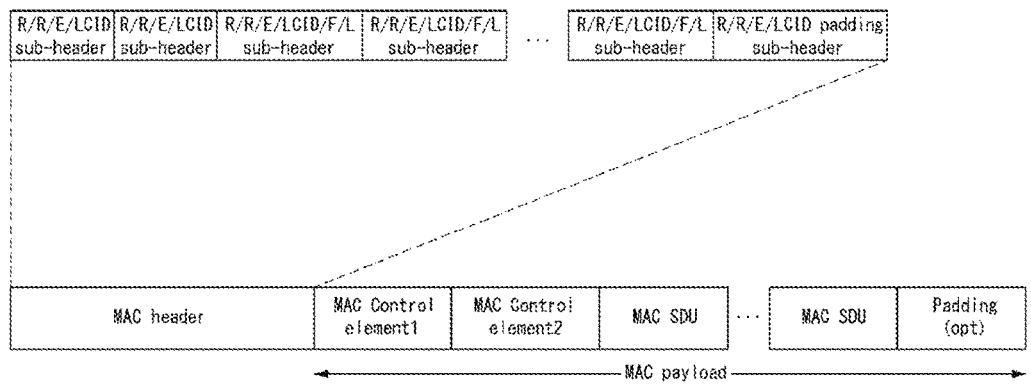
[FIG. 9]
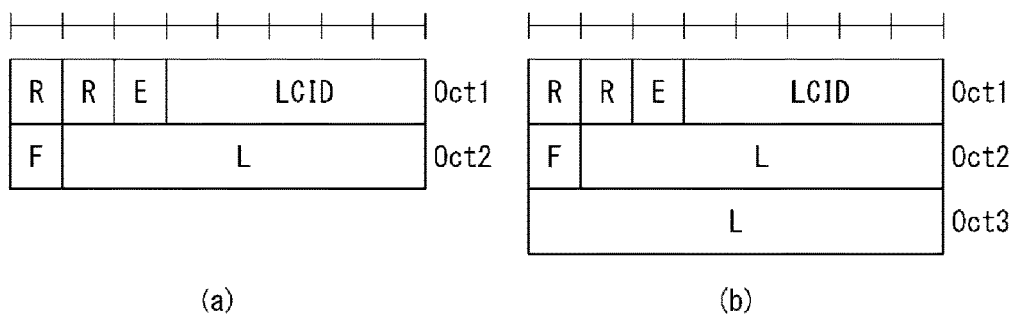
(a)  (b)
[FIG. 10]
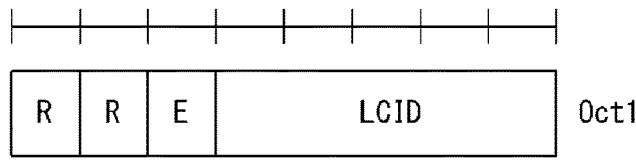

[FIG. 11]
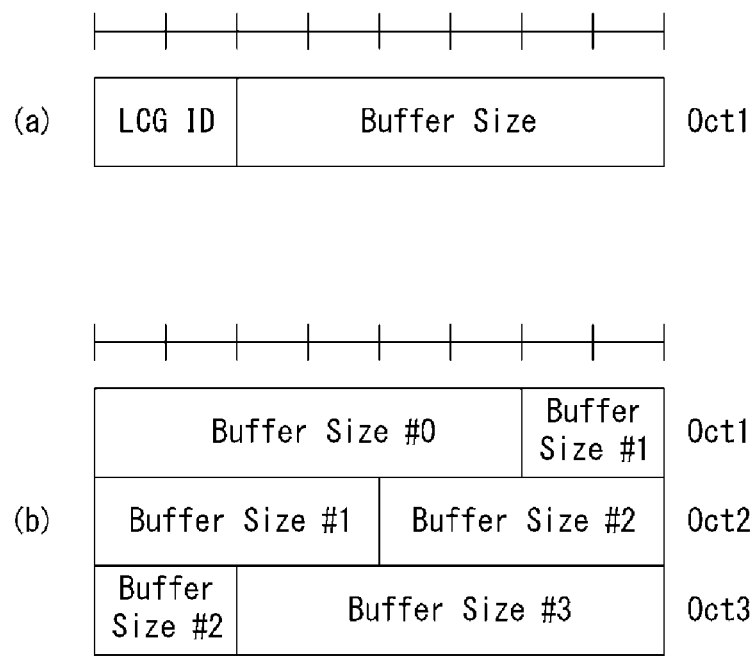

【FIG. 12】
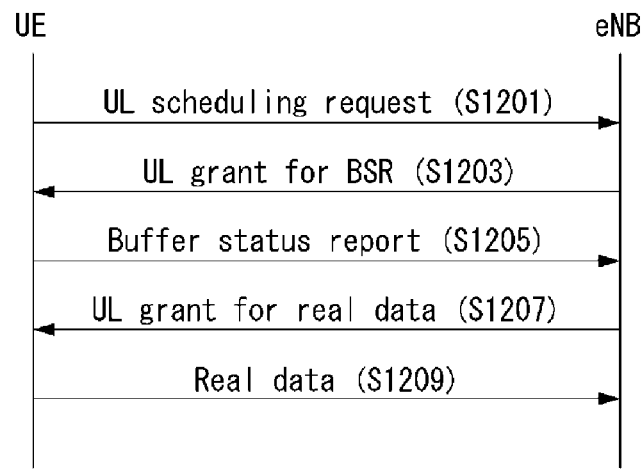
(a)
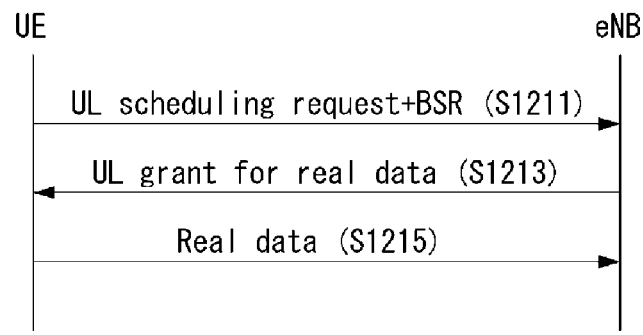
(b)

[FIG. 13]
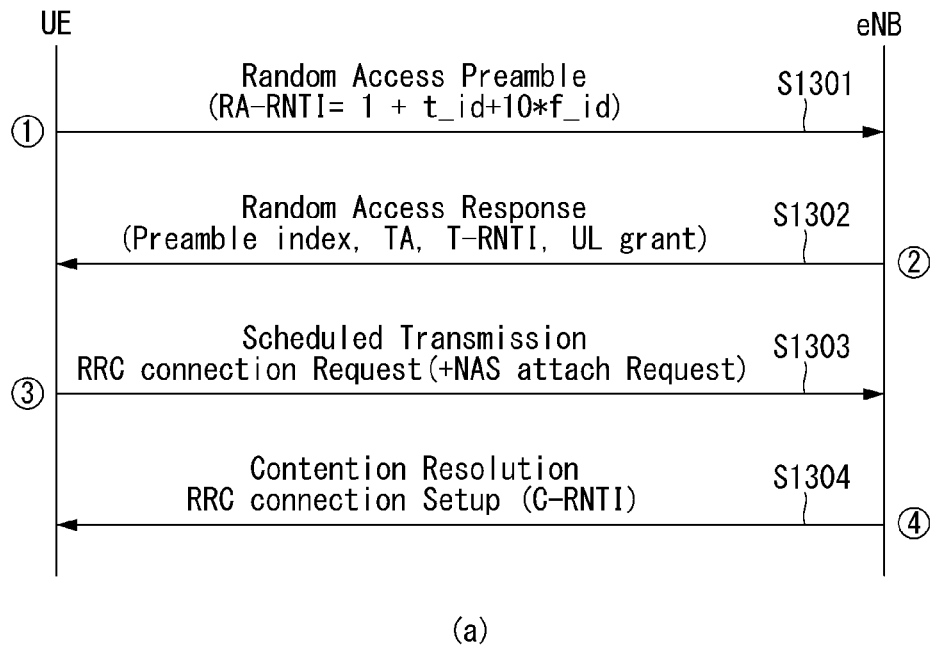
(a)
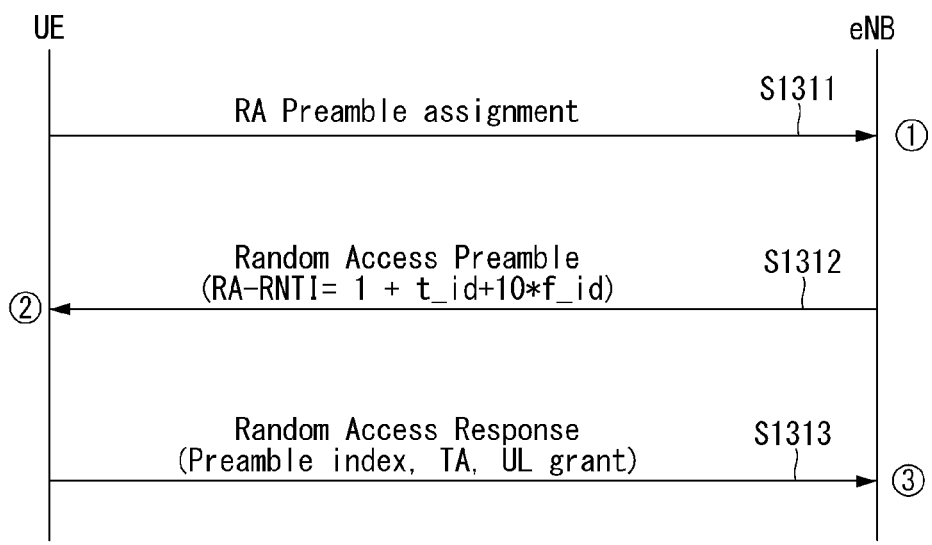
(b)

[FIG. 14]
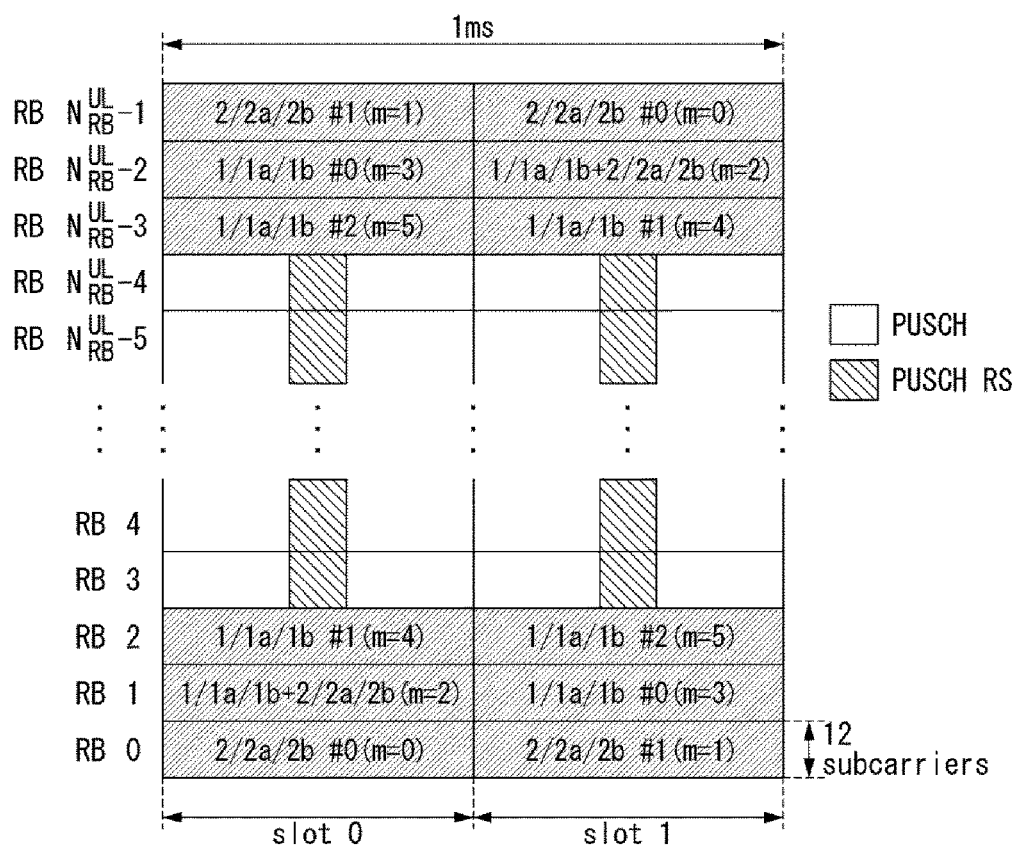

【FIG. 15】
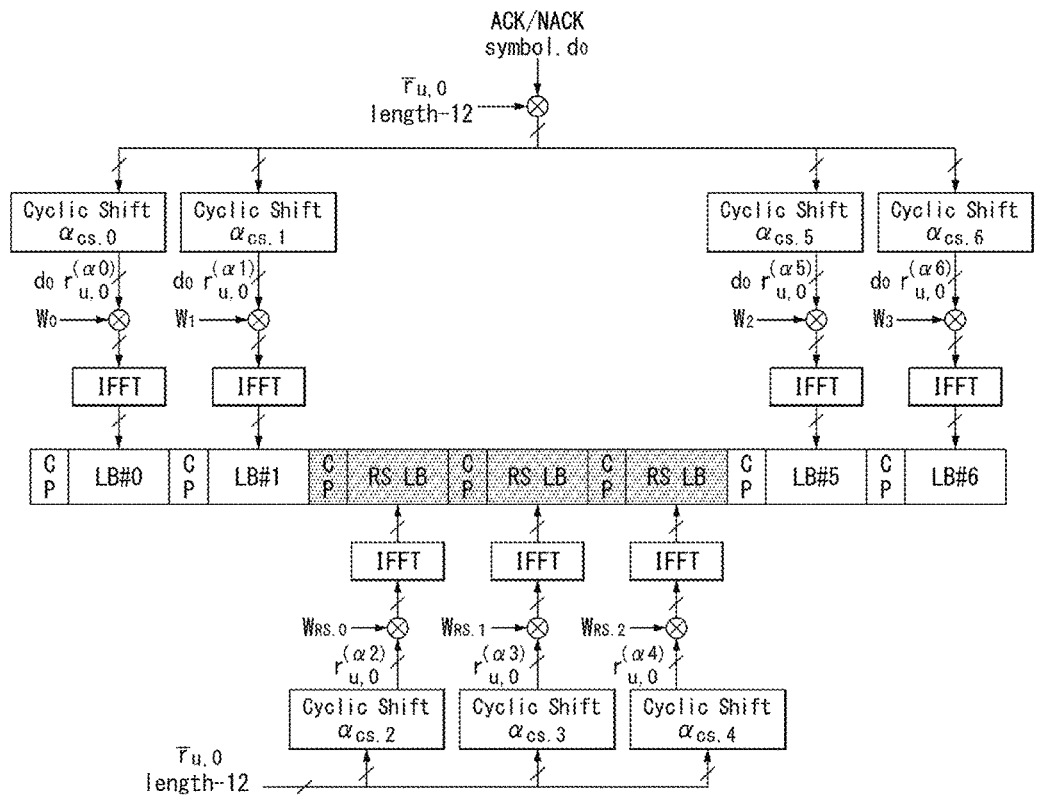
【FIG. 16】
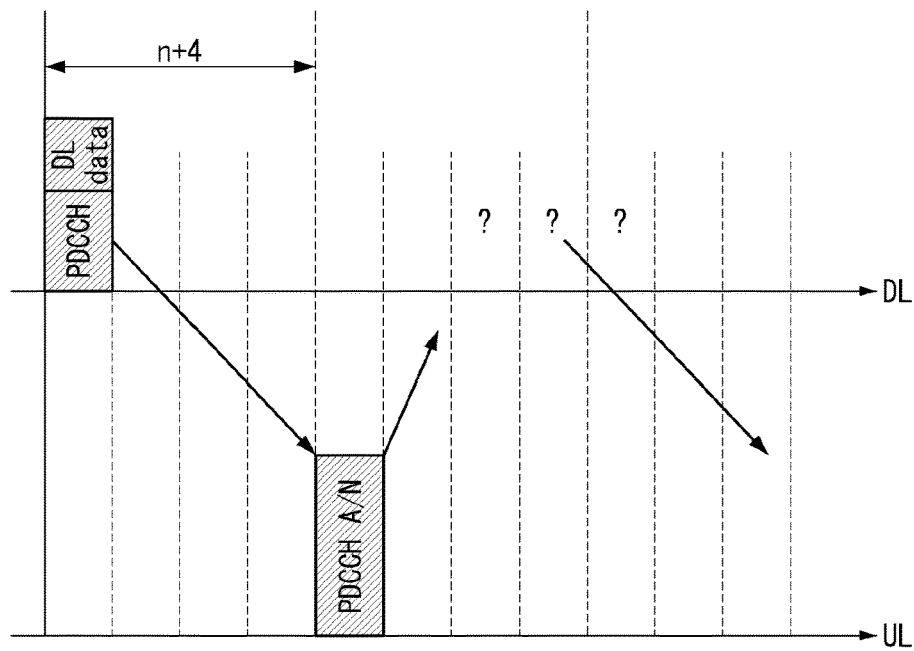

【FIG. 17】
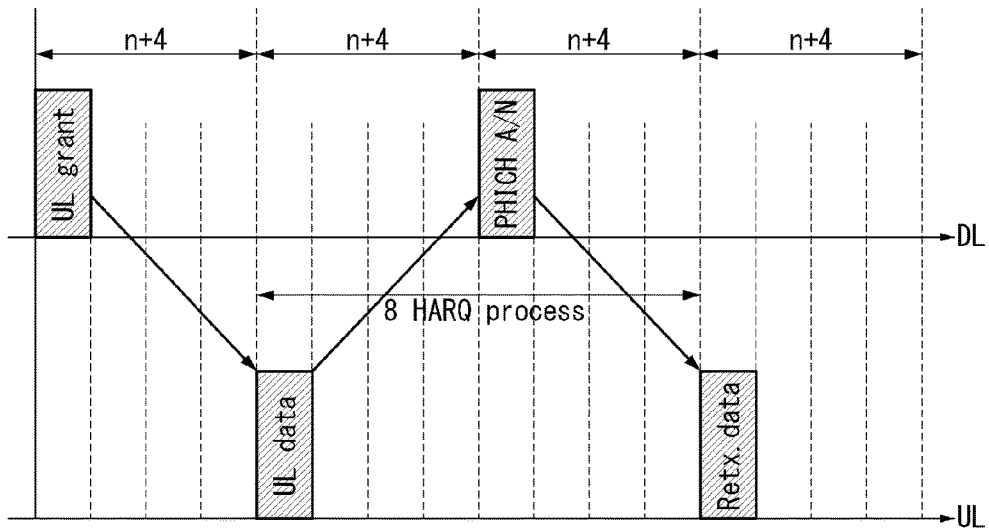
【FIG. 18】
| 0/1A | FH | RESOURCE BLOCK ALLOCATION | MCS/RV (5) | NDI | TPC (2) | DMRS CS (3) | UI (2) | DAI (2) | CQI req. |
|---|---|---|---|---|---|---|---|---|---|
【FIG. 19】
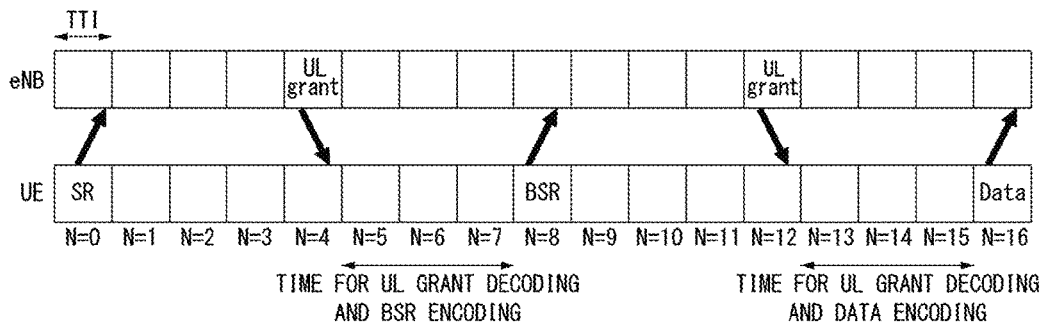

[FIG. 20]
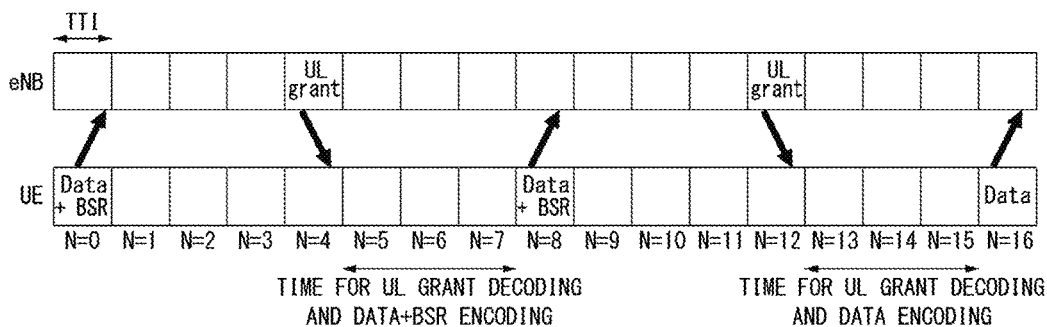
[FIG. 21]
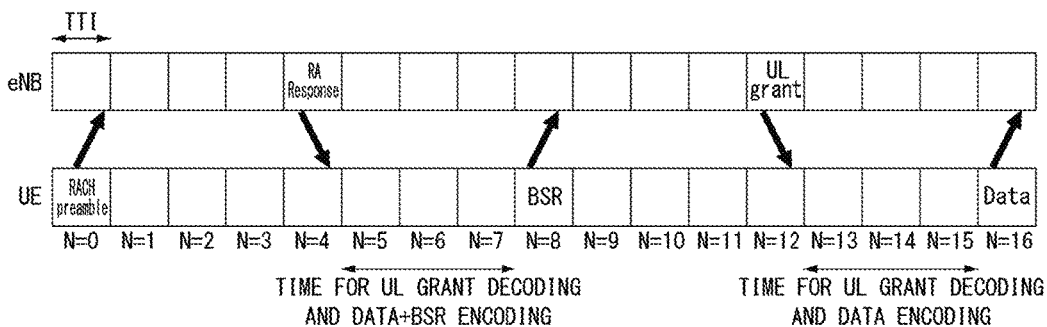

【FIG. 22】
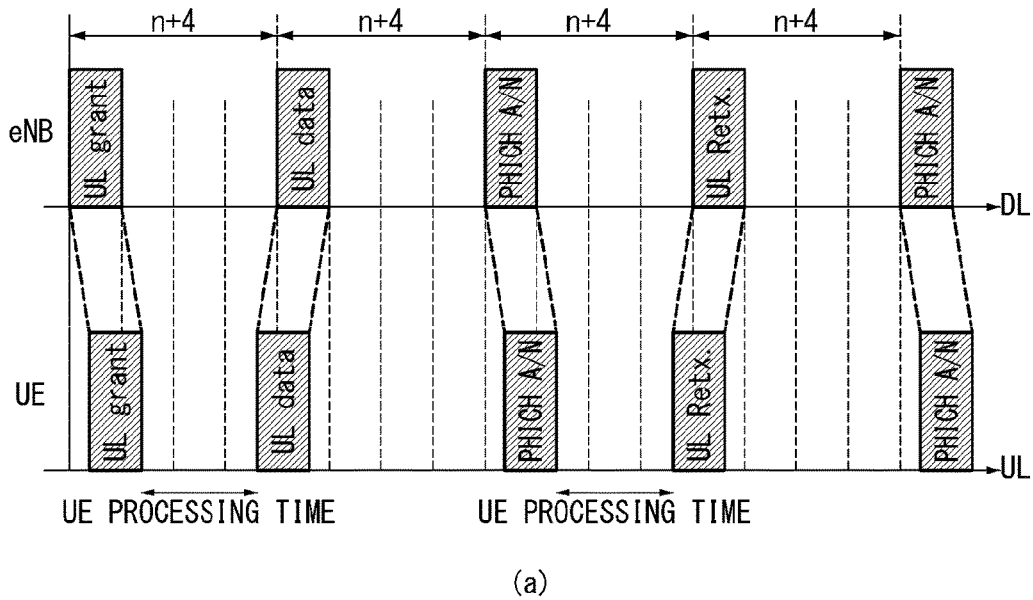
(a)
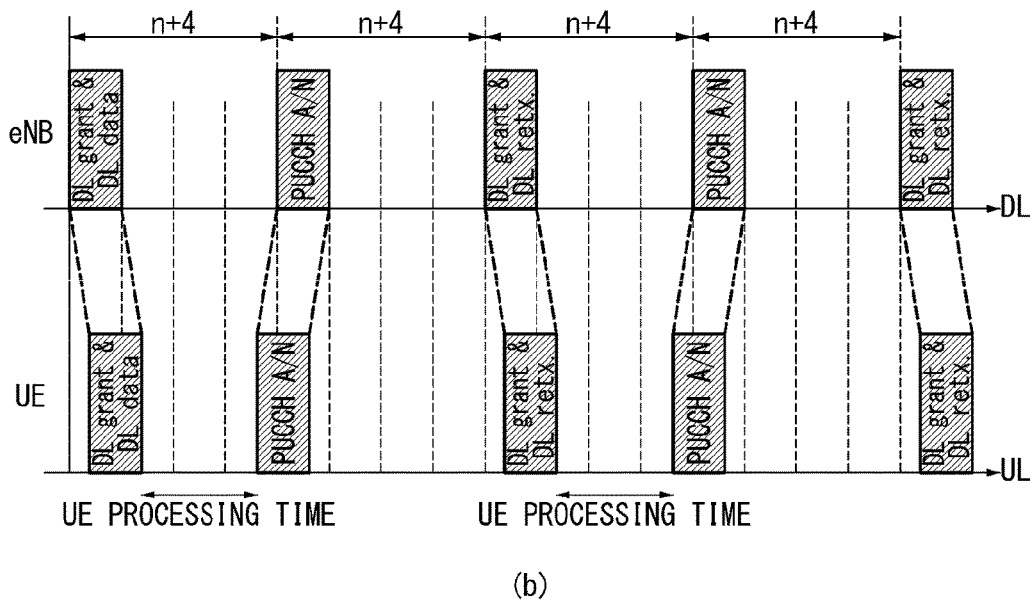
(b)
【FIG. 23】
| SF_offset | HARQ PID | $RB_{START}$ |
|---|---|---|

【FIG. 24】
| SF_offset | HARQ PID | RV | $RB_{START}$ |
【FIG. 25】
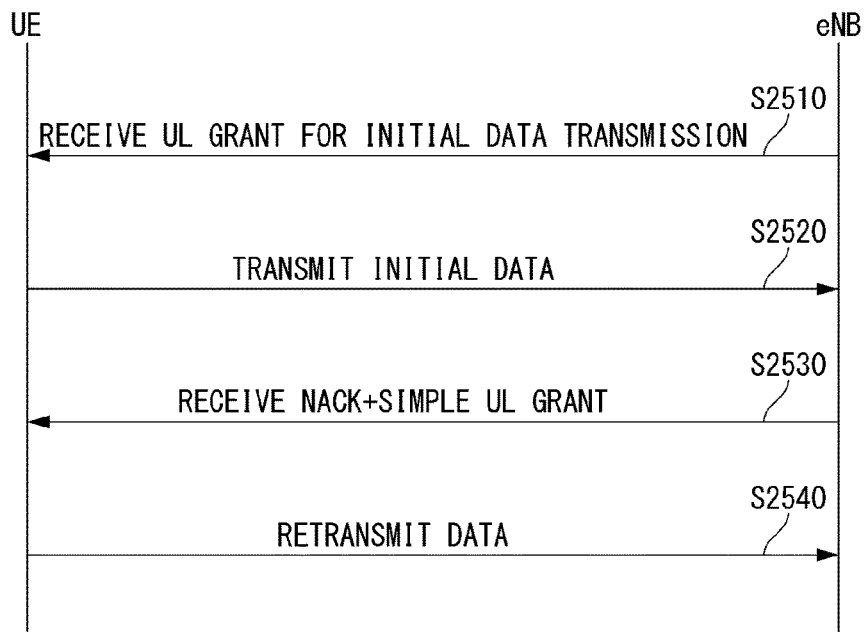

[FIG. 26]
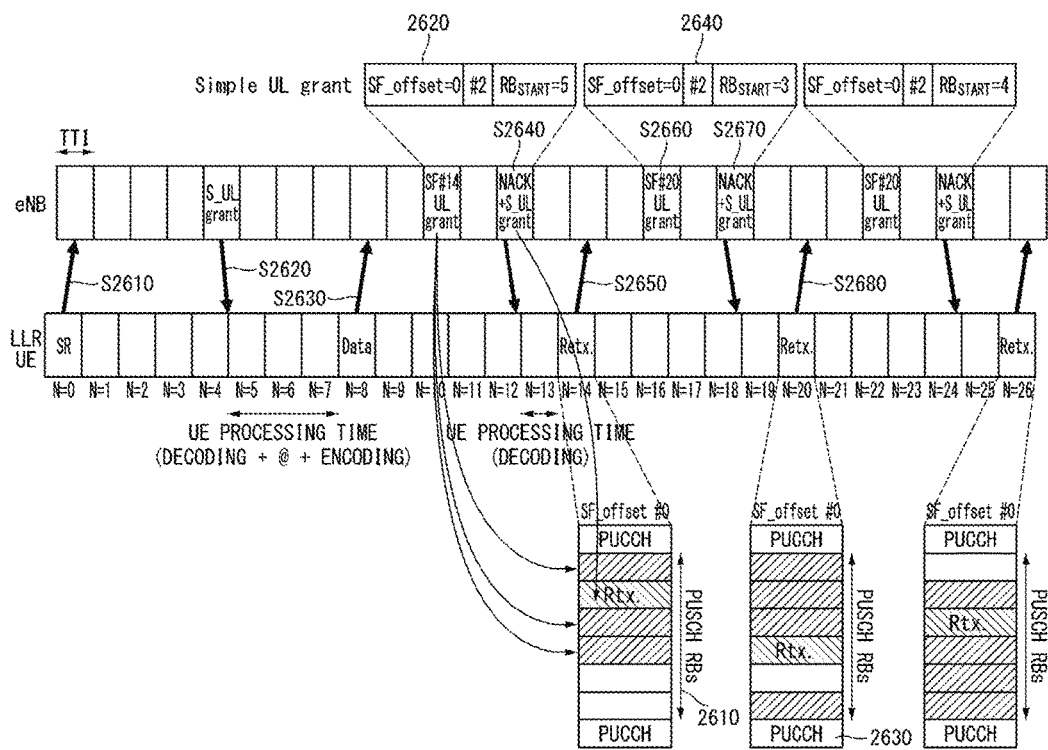

[FIG. 27]
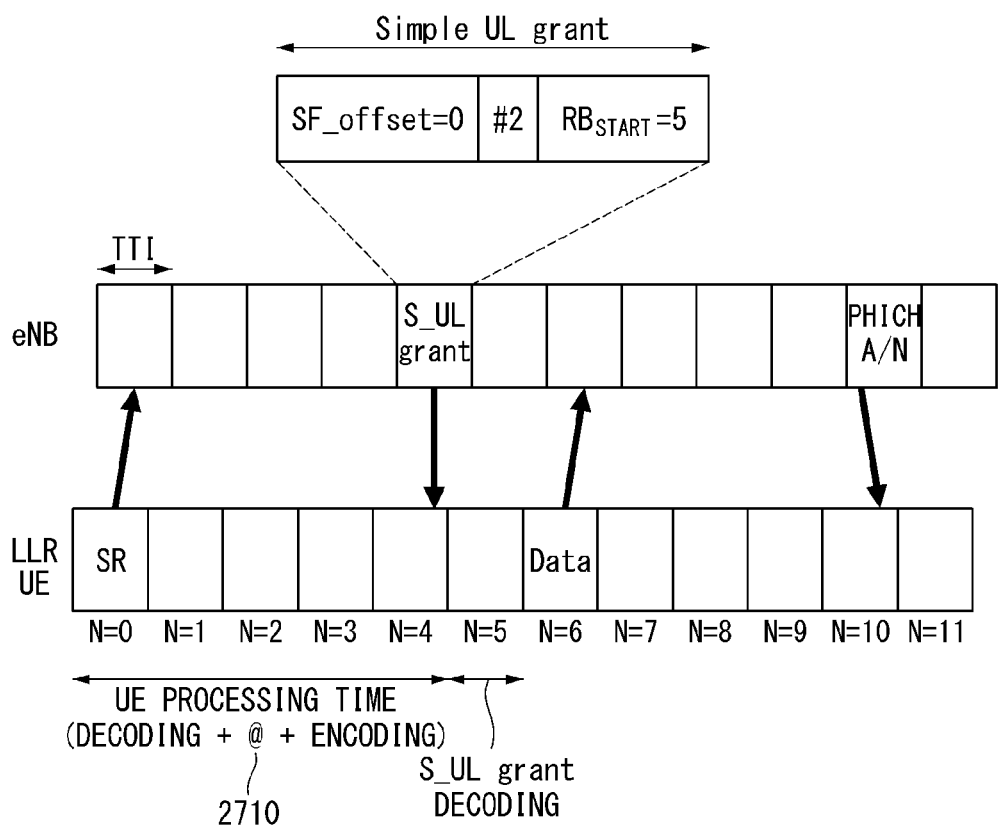

[FIG. 28]
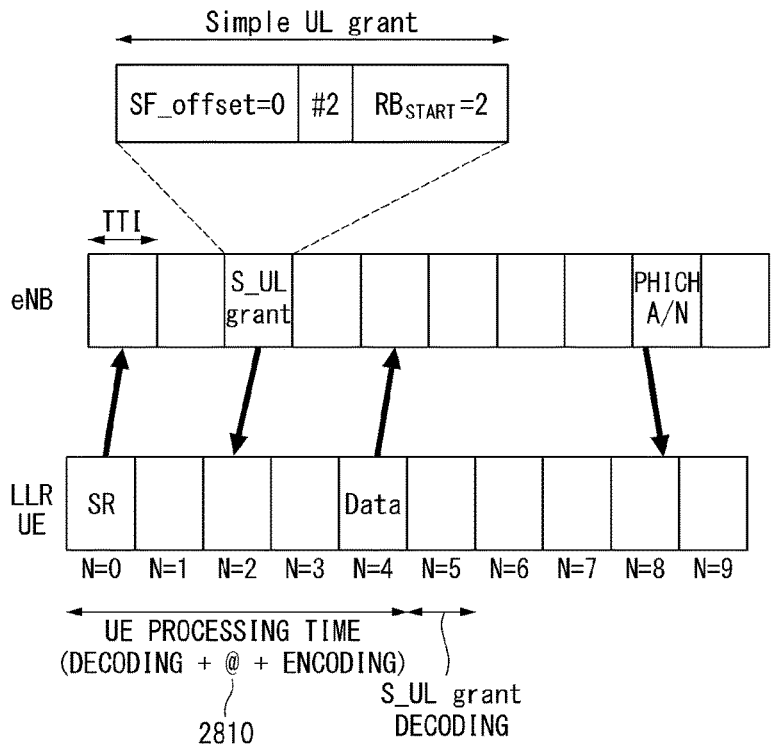
[FIG. 29]
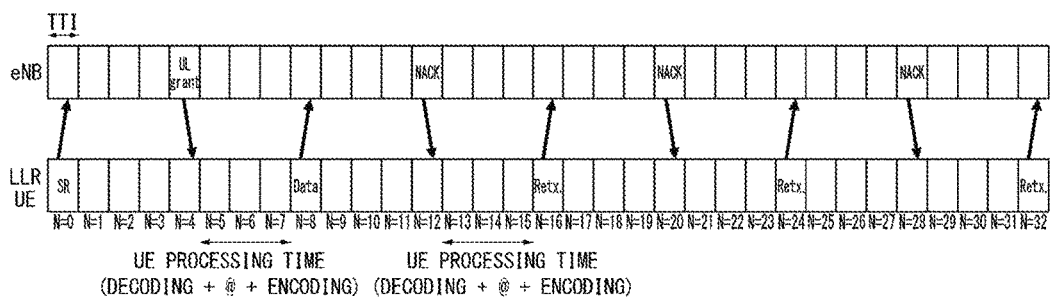

[FIG. 30]
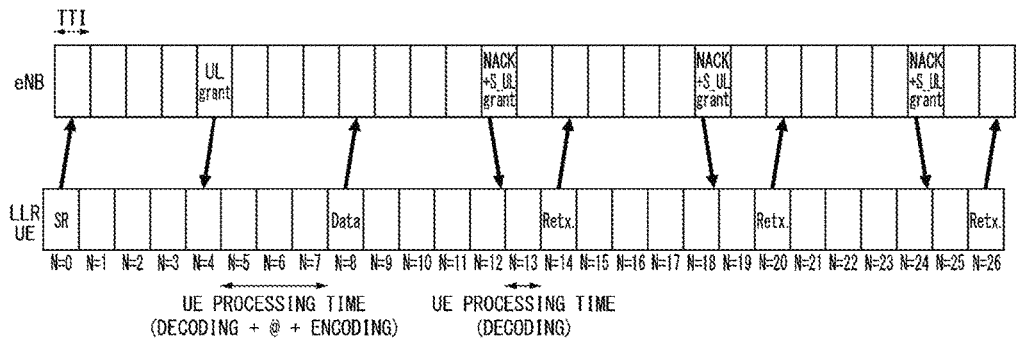
[FIG. 31]
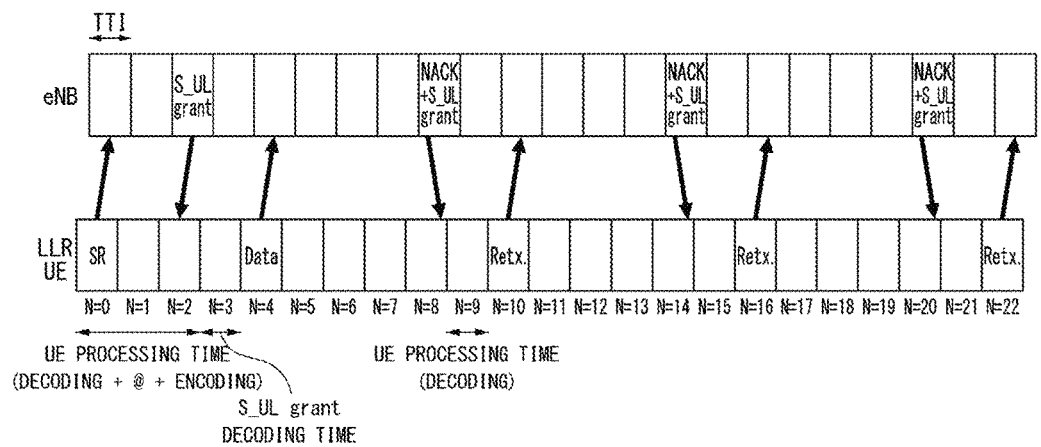
[FIG. 32]
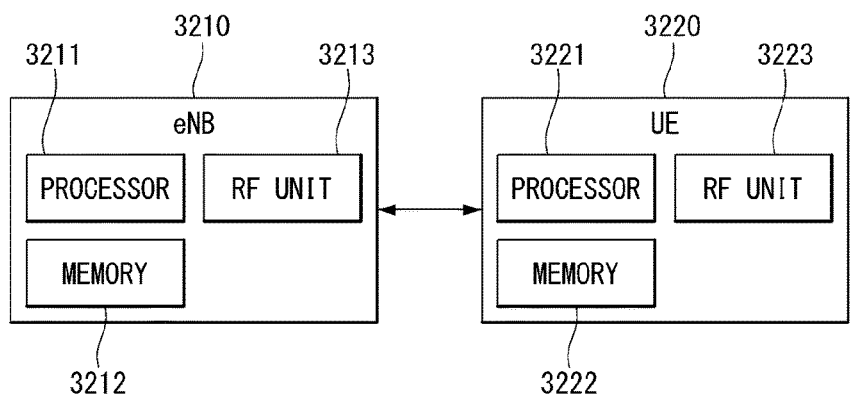

METHOD OF FAST-RETRANSMITTING UPLINK DATA IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/010170, filed on Sep. 25, 2015, which claims the benefit of U.S. Provisional Application No. 62/133,480, filed on Mar. 16, 2015, the contents of which are all hereby incorporated by reference herein in their entirety.

TECHNICAL FIELD

The present invention relates to wireless communication systems, and more particularly, to a method for fast-retransmitting uplink data in a wireless communication system and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a fast-retransmission method of uplink data performed by a user equipment by newly defining a simple UL grant in order to support new 5G low latency wireless service.

In addition, another object of the present disclosure is to provide a method for fast-retransmitting initial data of a user equipment by applying a simple UL grant newly defined for data of fixed size generated from a specific application.

The technical objects to attain in the present disclosure are not limited to the above-described technical objects and other technical objects which are not described herein will become apparent to those skilled in the art from the following description.

Technical Solution

The present disclosure relates to a method for transmitting uplink (UL) data performed by a user equipment (UE) in a wireless communication system that supports a low latency system. The present disclosure includes receiving a UL grant for an initial data transmission from a base station; transmitting the initial data to the base station based on the received UL grant; receiving a negative acknowledgement (NACK) for the initial data transmission and a simple UL grant including resource information in relation to a retransmission of the initial data from the base station; and performing the retransmission of the initial data based on the received simple UL grant, where the simple UL grant includes at least one of a subframe offset (SF_offset) field representing a subframe (SF) offset from a subframe (SF) on which the base station transmits the simple UL grant, a HARQ process ID (HARQ PID) field representing a HARQ process ID that corresponds to retransmission data or a RBSTART field representing an index of a resource allocation start resource of the retransmission data.

In addition, in the present disclosure, the simple UL grant further includes a redundancy version (RV) field representing a version of redundancy in HARQ of incremental redundancy scheme.

In addition, in the present disclosure, the NACK is received through a Physical Hybrid-ARQ Indicator Channel (PHICH), and the simple UL grant is received through a Physical Downlink Control Channel (PDCCH).

In addition, in the present disclosure, the UL grant is the simple UL grant when the initial data is data having a fixed size.

In addition, the present disclosure further includes transmitting control information representing whether the initial data is general data or data of a fixed size to the base station.

In addition, in the present disclosure, the control information is transmitted to the base station through a scheduling request (SR).

In addition, in the present disclosure, a method for transmitting uplink (UL) data performed by a base station in a wireless communication system that supports a low latency system includes transmitting a UL grant for an initial data transmission of a user equipment (UE) to the UE; receiving the initial data to the UE; transmitting a simple UL grant including a negative acknowledgement (NACK) and resource information in relation to a retransmission of the initial data to the UE, when decoding of the received initial data is failed; and receiving retransmission data for the initial data from the UE based on the simple UL grant, where the simple UL grant includes at least one of a subframe offset (SF_offset) field representing a subframe (SF) offset from a subframe (SF) for transmitting the simple UL grant to the UE, a HARQ process ID (HARQ PID) field representing a HARQ process ID that corresponds to the retransmission data or a RB START field representing an index of a resource allocation start resource of the retransmission data.

In addition, in the present disclosure, a user equipment (UE) transmitting uplink (UL) data in a wireless communication system that supports a low latency system includes a radio frequency (RF) unit for transmitting and receiving a radio signal; and a processor functionally connected to the RF unit, where the processor is configured to perform: receiving a UL grant for an initial data transmission from a base station; transmitting the initial data to the base station based on the received UL grant; receiving a negative acknowledgement (NACK) for the initial data transmission and a simple UL grant including resource information in relation to a retransmission of the initial data from the base station; and performing the retransmission of the initial data based on the received simple UL grant, where the simple UL grant includes at least one of a subframe offset (SF_offset) field representing a subframe (SF) offset from a subframe (SF) on which the base station transmits the simple UL grant, a HARQ process ID (HARQ PID) field representing a HARQ process ID that corresponds to retransmission data or a RBSTART field representing an index of a resource allocation start resource of the retransmission data.

Technical Effects

The present disclosure has an effect of retransmitting uplink data fast without resource collision with other user equipment(s) through a fast resource allocation method of a base station using a simple UL grant which is newly defined in the case of trying to transmit data fast which is previously generated to uplink.

In addition, the present disclosure has an effect of decreasing retransmission delay as much as from minimum 1 TTI to maximum 10 TTI in comparison with the previous UL data transmission by applying a simple UL grant to both of an initial transmission and a retransmission.

The technical effects of the present disclosure are not limited to the technical effects described above, and other technical effects not mentioned herein may be understood to those skilled in the art from the description below.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of the network configuration of an evolved universal terrestrial radio access network (E-UTRAN) to which an embodiment of the present invention may be applied.

FIG. 2 illustrates the structure of a radio interface protocol between a UE and an E-UTRAN in a wireless communication system to which an embodiment of the present invention may be applied.

FIG. 3 is a diagram illustrating physical channels used in a 3GPP LTE/LTE-A system to which an embodiment of the present invention may be applied and a known signal transmission method using the physical channels.

FIG. 4 illustrates the structure of a radio frame in 3GPP LTE/LTE-A to which an embodiment of the present invention may be applied.

FIG. 5 is a diagram illustrating a resource grid for a single DL slot in a wireless communication system to which an embodiment of the present invention may be applied.

FIG. 6 illustrates the structure of a DL subframe in a wireless communication system to which an embodiment of the present invention may be applied.

FIG. 7 illustrates the structure of an UL subframe in a wireless communication system to which an embodiment of the present invention may be applied.

FIG. 8 is a diagram illustrating an example of an MAC PDU used in an MAC entity in a wireless communication system to which an embodiment of the present invention may be applied.

FIGS. 9 and 10 illustrate the subheader of the MAC PDU in a wireless communication system to which an embodiment of the present invention may be applied.

FIG. 11 is a diagram illustrating an example of the format of an MAC control element for a buffer status report in a wireless communication system to which an embodiment of the present invention may be applied.

FIG. 12 is a diagram illustrating an example of a process of allocating UL resources to a UE in a wireless communication system to which an embodiment of the present invention may be applied.

FIG. 13 is a diagram illustrating an example of a random access procedure to which an embodiment of the present invention may be applied.

FIG. 14 illustrates an example of a type in which PUCCH formats are mapped to a PUCCH region of an uplink physical resource block in the wireless communication system to which the present invention may be applied.

FIG. 15 illustrates a structure of an ACK/NACK channel in the case of the normal CP in a wireless communication system to which the present invention may be applied.

FIG. 16 illustrates an example of asynchronous HARQ operation in downlink.

FIG. 17 illustrates an example of synchronous HARQ operation in downlink.

FIG. 18 is a diagram illustrating an example of DCI format 0.

FIGS. 19 and 20 are diagrams illustrating an example of a method for transmitting actual data through a scheduling request and BSR procedure.

FIG. 21 is a diagram illustrating an example of a method for transmitting actual data through RACH procedure.

FIG. 22 illustrates an example of a processing time.

FIGS. 23 and 24 illustrate an example of the simple UL grant format proposed in the present disclosure.

FIG. 25 is a flowchart illustrating an example of a fast retransmission method of UL data proposed in the present disclosure.

FIG. 26 is a diagram illustrating an example of a fast retransmission method of UL data using the simple UL grant format proposed in the present disclosure.

FIGS. 27 and 28 are diagrams illustrating a method for transmitting initial data of a UE using the simple UL grant format proposed in the present disclosure.

FIGS. 29 to 31 are diagrams illustrating a retransmission delay time compared with the conventional method when using the simple UL grant format proposed in the present disclosure.

FIG. 32 illustrates a block diagram of a wireless communication apparatus to which the methods proposed in the present disclosure may be applied.

BEST MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal.

In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CON- NECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12*7 resource elements. The resource element on the resource grid may be identified by an index pair (k, l) in the slot. Here, k (k=0, ..., NRB×12-1) denotes an index of subcarrier in the frequency domain, and l (l=0, ..., 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include a padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9 (a)), otherwise, the 15-bit L field may be used (FIG. 9 (b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11 (b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

Random Access Channel (RACH) Procedure

FIG. 13a and FIG. 13b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 13a illustrates one example of a contention-based random access procedure, and FIG. 13b illustrates one example of a non-contention based random access procedure.

First, the contention-based random access procedure will be described with reference to FIG. 13.

The UE receives information about random access from the eNB through system information and stores the received information. Afterwards, in case random access is needed, the UE transmits a random access preamble (which is also called a message 1) to the eNB S1301.

If the eNB receives a random access preamble from the UE, the eNB transmits a random access response message (which is also called a message 2) to the UE S1302. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1303. At this time, uplink transmission may be described as scheduled transmission.

After receiving the uplink transmission from the UE, the eNB transmits a message for contention resolution (which is also called a message 4) to the UE through a downlink shared channel (DL-SCH) S1304.

Next, a non-contention based random access procedure will be described with reference to FIG. 13b.

Before the UE transmits a random access preamble, the eNB allocates a non-contention random access preamble to the UE S1311.

The non-contention random access preamble can be allocated through a handover command or dedicated signaling such as signaling through the PDCCH. In case non-contention random access preamble is allocated to the UE, the UE transmits the allocated non-contention random access preamble to the eNB S1312.

Afterwards, similarly to the S1402 step of the contention-based random access procedure, the UE can transmit a random access response (which is also called a message 2) to the UE S1413.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

The Uplink Control Information (UCI) transmitted through a PUCCH may include a Scheduling Request (SR), HARQ ACK/NACK information, and downlink channel measurement information.

The HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

The Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. In the case that Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of a UE. Furthermore, ACK/NACK information about downlink data transmission transmitted through a PUCCH is covered using an orthogonal sequence or an Orthogonal Cover (OC).

In addition, the control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel A variety of types of sequences may be used as the base sequence, and the CAZAC sequence is an example of the sequences.

Furthermore, the amount of control information that may be transmitted by a UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 8 different formats depending on control information that is transmitted, a modulation scheme, and the amount of control information. The attributes of Uplink Control Information (UCI) transmitted according to each PUCCH format may be summarized as in Table 4 below.

TABLE 4

| PUCCH format | Modulation scheme | # of bits per sub-frame | Usage |
| --- | --- | --- | --- |
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for SR-only transmission. In the case of SR-only transmission, a waveform which is not modulated is applied.

The PUCCH format 1a or 1b is used to transmit HARQ ACK/NACK. In the case that HARQ ACK/NACK is solely transmitted in a specific subframe, PUCCH format 1a or 1b may be used. Alternatively, HARQ ACK/NACK and an SR may be transmitted in the same subframe using PUCCH format 1a or 1b.

As described above, PUCCH format 1a or 1b may be used for the case that an SR is transmitted together with HARQ ACK/NACK. A PUCCH index for HARQ ACK/NACK is implicitly determined from a lower CCE index which is mapped for the related PDCCH.

Multiplexing Negative SR with A/N
: A UE transmits A/N to A/N PUCCH resource which is mapped to the lowest CCE index used in a PDCCH.

Multiplexing Positive SR with A/N
: A UE transmits A/N using the SR PUCCH resource allocated from an eNB.

PUCCH format 2 is used for the transmission of a CQI, and PUCCH format 2a or 2b is used for the transmission of a CQI and HARQ ACK/NACK.

In the case of the extended CP, PUCCH format 2 may also be used for the transmission of a CQI and HARQ ACK/NACK.

An SR resource of a UE is setup/release through an RRC Connection Reconfig (Radio Resource Config. Dedicated (Physical config. Dedicated (SR config))).

Here, SR resource for maximum 2048 UEs is available to be allocated in one subframe. This means that 2048 logical indexes are defined for PUCCH, and the physical resource for PUCCH formats 1 to 3 may be mapped up to 2048 logically.

It is designed that an SR periodicity may be set to 1 ms to 80 ms according to an SR configuration index in the configuration of SR resource per UE, and an SR subframe offset is also configured according to an index.

An SR signaling of a UE is defined to use simple On-Off Keying (O.O.K) scheme, and defined to mean that D(0)=1: Request a PUSCH resource (positive SR), Transmitting nothing: not request to be scheduled (negative SR).

In addition, an SR is designed to use the CAZAC sequence having the length of 12 and the OC sequences having the length of 3 such that the SR for maximum 36 UEs is able to be allocated through PUCCH 1 RB (in the case of the Normal CP).

A DMRS position of PUCCH format 1/1a/1b(A/N, SR) will be described in detail below in FIG. 14.

FIG. 14 illustrates an example of a type in which PUCCH formats are mapped to a PUCCH region of an uplink physical resource block in the wireless communication system to which the present invention may be applied.

In FIG. 14, $N_{RB}^{UL}$ represents the number of resource blocks in the uplink, and $0, 1, \ldots, N_{RB}^{UL}-1$ mean the numbers of physical resource blocks. Basically, the PUCCH is mapped to both edges of an uplink frequency block. As illustrated in FIG. 14, PUCCH format 2/2a/2b is mapped to a PUCCH region expressed as m=0, 1 and this may be expressed in such a manner that PUCCH format 2/2a/2b is mapped to resource blocks positioned at a band edge. Furthermore, both PUCCH format 2/2a/2b and PUCCH format 1/1a/1b may be mixedly mapped to a PUCCH region expressed as m=2.

Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to UEs in a cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency unit (or a frequency resolution) to be measured may be controlled by an eNB. In the time domain, periodic and aperiodic CQI reporting may be supported. PUCCH format 2 may be used for only the periodic reporting and the PUSCH may be used for aperiodic reporting. In the case of the aperiodic reporting, an eNB may instruct a UE to transmit a scheduling resource on which an individual CQI reporting is carried for the uplink data transmission.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by the CAZAC sequence r(n) (n=0, 1, 2, ..., N−1) having a length of N becomes y(0), y(1), y(2), ..., y(N−1). y(0), ..., y(N−1) symbols may be designated as a block of symbols. After the modulated symbol is multiplied by the CAZAC sequence, the block-wise spread using the orthogonal sequence is applied.

A Hadamard sequence having a length of 4 is used with respect to normal ACK/NACK information and a discrete Fourier transform (DFT) sequence having a length of 3 is used with respect to the ACK/NACK information and the reference signal.

The Hadamard sequence having a length of 2 is used with respect to the reference signal in the case of the extended CP.

FIG. 15 illustrates a structure of an ACK/NACK channel in the case of the normal CP in a wireless communication system to which the present invention may be applied.

In FIG. 15, a PUCCH channel structure for transmitting the HARQ ACK/NACK without the CQI is exemplarily illustrated.

The reference signal (RS) is carried on three consecutive SC-FDMA symbols in a middle part among 7 SC-FDMA symbols included in a single slot and the ACK/NACK signal is carried on the remaining four SC-FDMA symbols.

Meanwhile, in the case of the extended CP, the RS may be carried on two consecutive symbols in the middle part. The number and the positions of symbols used in the RS may vary depending on the control channel, and the numbers and the positions of symbols used in the ACK/NACK signal associated with the positions of symbols used in the RS may also correspondingly vary depending on the control channel.

Acknowledgment response information (not scrambled state) of 1 bit and 2 bits may be represented as one HARQ ACK/NACK modulation symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional spread is applied in order to increase a multiplexing capacity. That is, frequency domain spread and time domain spread are simultaneously applied in order to increase the number of UEs or the control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and accordingly, multiplexing different UEs or different control channels may be applied. The number of CS resources supported in an SC-FDMA symbol for PUCCH RBs for HARQ ACK/NACK transmission is set by a cell-specific higher-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having a length of 4 with respect to four symbols. In addition, an RS is also spread through an orthogonal sequence having a length of 3 or 2. This is referred to as orthogonal covering (OC).

A plurality of UEs may be multiplexed by a code division multiplexing (CDM) scheme by using the CS resources in the frequency domain and the OC resources in the time domain described above. That is, ACK/NACK information and RSs of a lot of UEs may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the normal CP, the ACK/NACK information may be transmitted in four symbols, and three orthogonal spreading codes, not 4, are used for the ACK/NACK information. This is because the number of RS transmitting symbols is limited to 3, and only three orthogonal spreading codes may be used for the RS.

In the case that three symbols are used for transmitting the RS and four symbols are used for transmitting the ACK/NACK information in one slot in a subframe of the normal CP, for example, when six CSs in the frequency domain and three orthogonal cover (OC) resources may be used, HARQ acknowledgement responses from a total of 18 different UEs may be multiplexed in one PUCCH RB. In the case of the subframe of the extended CP, when 2 symbols are used for transmitting the RS and 4 symbols are used for transmitting the ACK/NACK information in one slot, for example, in the case that six CSs in the frequency domain and two orthogonal cover (OC) resources may be used, the HARQ acknowledgement responses from a total of 12 different UEs may be multiplexed in one PUCCH RB.

Next, PUCCH format 1 is described. The scheduling request (SR) is transmitted by a scheme in which a UE requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the normal CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, a UE transmits the HARQ ACK/NACK through a resource allocated for the SR in order to transmit a positive SR. A UE transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of a plurality of UEs may be multiplexed on the same RB by using the OCC. In the case of PUCCH format 2 described above, one symbol sequence is transmitted throughout the time domain and the control signals of a plurality of UEs are multiplexed by using the cyclic shift (CS) of the CAZAC sequence, while in the case of a block spreading based on PUCCH format (for example, PUCCH format 3), one symbol sequence is transmitted throughout the frequency domain and the control signals of a plurality of UEs are multiplexed by using the time domain spreading using the OCC.

HARQ Process in LTE/LTE-A System

In the current LTE, 8 HARQ process is used for recovering error of data, and two types of HARQ are defined according to retransmission timing of data as follows.

FIG. 16 illustrates an example of asynchronous HARQ operation in downlink.

Referring to FIG. 16, when transmitting retransmission data, an eNB that receives NACK transmits the data by setting NDI in a DL grant (DCI format 1) as a bit that represents a retransmission. In this case, the NDI includes HARQ process ID, and represents which data is retransmitted.

FIG. 17 illustrates an example of synchronous HARQ operation in downlink.

Referring to FIG. 17, an eNB that transmits NACK transmits retransmission data with the same resource as an initial data transmission by allocating data resource for retransmission to a new resource by setting NDI in a DL grant (DCI format 1) as a bit that represents a retransmission, or omitting a UL grant. In this case, the retransmission timing is always fixed at the subframe after 4 ms when receiving NACK.

The HARQ scheme tries to correct error for a received code basically, and determines whether to retransmit it by using simple error detection code such as Cyclic Redundancy Check (CRC). For a retransmission, the HARQ scheme is divided into three types as follows, and LTE performs the HARQ scheme through CC (second technique) or IR (third technique).

1) Type-I HARQ Scheme: A receiver discards a packet having an error and requests for retransmission, and a transmitter transmits the packet which is the same as that of an initial transmission. By discarding a packet having an error, an increase in reliability of a system and a performance increase through FEC are obtained.

2) Type-I HARQ Scheme with Chase Combining: This is a technique, instead of discarding a packet having an error, of using the packet by combining it with a retransmitted packet. By combining several packets, an effect of increasing signal power may be obtained, consequently.

3) Type-II HARQ Scheme (Incremental redundancy Scheme): This is a technique of using a code of high code rate in an initial transmission and transmitting an additional redundancy when a retransmission occurs in order to prevent the case of transmitting a code of high redundancy in an initial transmission unnecessarily in the case of Type-I.

PHICH (Physical HARQ Indication Channel)

Hereinafter, a PHICH is described.

Since an LTE system does not support SU-MIMO in an uplink, one PHICH carries only 1-bit ACK/NACK corresponding to a PUSCH for a UE, that is, for a single stream.

The 1-bit ACK/NACK is coded into 3 bits by using a repetition code having a code rate of 1/3. The coded ACK/NACK is modulated using binary phase shift keying (BPSK) to generate 3 modulation symbols. The modulation symbols are spread by using a spreading factor (SF) of 4 in the normal CP structure and by using an SF of 2 in the extended CP structure.

An orthogonal sequence is used when spreading the modulation symbols, and the number of orthogonal sequences used in the spreading is SF×2 in order to apply I/Q multiplexing.

PHICHs which are spread by using SF×2 orthogonal sequences may be defined as one PHICH group. A layer mapping is performed on the spread symbols. The layer-mapped symbols are transmitted by being mapped to resources.

The PHICH carries HARQ ACK/NACK depending on PUSCH transmission. A plurality of PHICHs mapped to resource elements of the same set constitutes a PHICH group. Each PHICH in the PHICH group is identified by a different orthogonal sequence. In the FDD system, $N_{PHICH}^{group}$, i.e., the number of PHICH groups, is constant in all subframes, and may be determined by Equation 1 below.

$$N_{PHICH}^{group} = \begin{cases} \lceil N_g(N_{RB}^{DL}/8) \rceil, & \text{for normal cyclic prefix} \\ 2 \times \lceil N_g(N_{RB}^{DL}/8) \rceil, & \text{for extended cyclic prefix} \end{cases} \quad \text{[Equation 1]}$$

In Equation 1, $N_g$ is transmitted in a higher layer through a physical broadcast channel (PBCH), where $N_g \in \{1/6, 1/2, 1, 2\}$. The PBCH carries essential system information when a UE communicates with an eNB. The system information transmitted through the PBCH is called a master information block (MIB).

In comparison, system information transmitted through a physical downlink control channel (PDCCH) is called a system information block (SIB). $N_{RB}^{DL}$ denotes a DL bandwidth configuration expressed with a multiple of $N_{sc}^{RB}$ which is an RB size in a frequency domain. A PHICH group index $n_{PHICH}^{group}$ is any one integer from 0 to $N_{PHICH}^{group} - 1$.

A resource used in the PHICH may be determined based on a lowest PRB index in resource allocation of the PUSCH and a cyclic shift (CS) value of a demodulation reference signal (DMRS) transmitted using a UL grant.

A resource to which the PHICH is mapped (hereinafter, a PHICH resource) may be expressed by an index pair $(n_{PHICH}^{group}, n_{PHICH}^{seq})$. Herein, $n_{PHICH}^{group}$ denotes a PHICH group index, and $n_{PHICH}^{seq}$ denotes an orthogonal sequence index in the PHICH group. The index pair $(n_{PHICH}^{group}, n_{PHICH}^{seq})$ may be determined by Equations 2 and 3 below.

$$n_{PHICH}^{group} = (I_{PRB_{RA}} + n_{DMRS}) \bmod N_{PHICH}^{group} + I_{PHICH} N_{PHICH}^{group} \quad \text{[Equation 2]}$$

$$n_{PHICH}^{seq} = (\lfloor I_{PRB\_RA}/N_{PHICH}^{group} \rfloor + n_{DMRS}) \bmod 2N_{SF}^{PHICH} \quad \text{[Equation 3]}$$

Herein, $n_{DMRS}$ may be mapped from a cyclic shift for a demodulation reference signal (DMRS) field in the latest PDCCH that has an uplink DCI format for a transport block in relation to a PUSCH transmission.

On the other hand, in a case there is no PDCCH including the uplink DCI format for the same transport block, $n_{DMRS}$ may be set to 0 when a first PUSCH is semi-persistently scheduled in the same transport block or when the first PUSCH is scheduled by a random access response grant.

$N_{SF}^{PHICH}$ denotes a spreading factor used in PHICH modulation.

$I_{PRB-RA}$ equals $I_{PRB-RA}^{lowest-index}$ when $I_{PRB-RA}$ is the first transport block of a PUSCH in relation to a PDCCH or when there is no related PDCCH, the number of transport block passively identified is not the same as the number of transport block indicated by the latest PDCCH.

On the other hand, when $I_{PRB-RA}$ is the second transport block of a PUSCH in relation to a PDCCH, $I_{PRB-RA}$ equals $I_{PRB-RA}^{lowest-index}-1$. Herein, $I_{PRB-RA}^{lowest-index}$ corresponds to the lowest PRB index of the first slot of the corresponding PUSCH transmission.

$n_{PHICH}^{group}$ represents the number of a PHICH group constructed by a higher layer.

$I_{PHICH}$ has a value of '1' when a PUSCH is transmitted in subframe index 4 or 9 in UL-DL configuration 0 in the TDD system, or has a value of '0' otherwise.

Table 5 represents a mapping relation between a cyclic shift and $n_{DMRS}$ for a DMRS field used for determining a PHICH resource in a PDCCH that has an uplink DCI format.

TABLE 5

| Cyclic Shift for DMRS Field in PDCCH with uplink DCI format | nDMRS |
|---|---|
| 000 | 0 |
| 001 | 1 |
| 010 | 2 |
| 011 | 3 |
| 100 | 4 |
| 101 | 5 |
| 110 | 6 |
| 111 | 7 |

DCI Format 0 (UL Grant) in LTE/LTE-A System

FIG. 18 is a diagram illustrating an example of DCI format 0.

In LTE a PUSCH resource is allocated through a UL grant of an eNB.

By transmitting DCI format 0 CRC masked by C-RNTI of a UE through a PDCCH, the LTE UL grant makes a UE to generate uplink data and transmit it according to an instruction of an eNB through receiving the corresponding information.

That is, FIG. 18 and Table 6 represent parameters of DCI format 0.

TABLE 6

| Format 0(release 8) | Format 0(release 8) |
|---|---|
|  | Carrier Indicator |
| Flag for format 1A differentiation | Flag for format 0/format 1A differentiation |
| Hopping flag | Hopping flag |
| Resource block assignment(RIV) | Resource block assignment(RIV) |
| MCS and RV | MCS and RV |
| NDI(New Data Indicator) | NDI(New Data Indicator) |
| TPC for PUSCH | TPC for PUSCH |
| Cyclic Shift for DM RS | Cyclic Shift for DM RS |
| UL index(TDD only) | UL index(TDD only) |
| Downlink Assignment Index(DAI) | Downlink Assignment Index(DAI) |
| CQI request(1 bit) | CSI request(1 or 2 bits: 2 bits are multi carrier) |
|  | SRS request |
|  | Resource allocation type |

Herein, the lengths of Hopping flag and RIV may have different lengths according to a system bandwidth as follows.

Hopping Flag
: 1 (1.4/3/5 Mhz) or 2 (10/15/20 Mhz) bits
Resource Block Assignment
: 5 (1.4 Mhz), 7 (3/5 Mhz), 11 (10 Mhz), 12 (15 Mhz), 13 (20 Mhz) bits A UL data transmission method in LTE (-A) or 802.16m is briefly described.

The cellular system such as LTE (-A) or 802.16m uses a resource allocation scheme based on an eNB scheduling.

In the system that uses the resource allocation scheme based on an eNB scheduling as such, a UE that has data to transmit (i.e., UL data) requests a resource for transmitting the corresponding data to an eNB before transmitting the data.

The scheduling request of a UE may be performed through a Scheduling Request (SR) transmission to a PUCCH or a Buffer Status Report (BSR) transmission to a PUSCH.

In addition, in the case that a resource for transmitting the SR or the BSR is not allocated to a UE, the UE may request an uplink resource to an eNB through the RACH procedure.

As such, an eNB that receives the scheduling request from a UE allocates the uplink resource that the corresponding UE is going to use to the UE through a downlink control channel (i.e., UL grant message, DCI in the case of LTE (-A)).

In this case, the UL grant transmitted to the UE may indicate which subframe the resource that is allocated to the UE corresponds to by explicit signaling, but may also define an appointed time between the UE and the eNB using the resource allocation for the subframe after a specific time (e.g., 4 ms in the case of LTE).

As such, the case that an eNB allocates a resource after X ms (e.g., 4 ms in the case of LTE) to a UE means that the eNB allocates the resource of UE by considering all of the times for receiving and decoding a UL grant and for preparing and encoding the data to transmit.

FIG. 19 is a diagram illustrating a time until a UE transmits actual data through 5 step scheduling request procedure using PUCCH SR resource.

As shown in FIG. 19, a UE may transmit actual uplink data after about 17 ms from the time of transmitting an SR signal.

In this case, the SR resource allocated to the UE may be allocated to a PUCCH with a specific period, minimum 1 ms to maximum 80 ms.

Here, in the case that the SR of 1 ms period is allocated to the corresponding UE, an average time for the UE to wait for the PUCCH resource for an SR transmission is 0.5 ms, and the delay time until the data transmission through a scheduling request to an eNB takes 17.5 ms.

In the case that a UE has an uplink resource allocated from an eNB beforehand, the UE may transmit the resource request for newly generated data by using the resource allocated beforehand.

Alternately, the UE may request an additional resource by transmitting a BSR together with the data transmitted with the resource allocated beforehand.

In this case, as shown in FIG. 20, the delay of 9 ms occurs until transmitting uplink data after a UE request a BSR.

In the case that there is no PUCCH SR resource or PUSCH resource that the UE is allocated from the eNB or the uplink is not synchronized, the UE may request the resource for the newly generated data using the RACH procedure.

That is, as shown in FIG. 21, the delay of 17 ms occurs until the UE transmits uplink data from the time of transmitting the RACH preamble to the eNB.

In this case, the PRACH resource that is available to transmit the RACH preamble may be configured with a specific period for each cell. Assuming the PRACH resource has the period of minimum 1 ms, the data transmission delay of average 17.5 ms may occur.

As described in FIG. 19 to FIG. 21, the UE may transmit actual data by undergoing the delay of minimum 9 ms to maximum 17.5 ms for transmitting uplink data.

Accordingly, the eNB allocates an optimal resource to each UE in a channel environment, and accordingly, the resource efficiency may be maximized, but the transmission delay occurs.

The requirement of 5G is increasing for supporting various real time application services such as health care, traffic safety, disaster safety, remote medical control, and so on.

Accordingly, 5G sets it as a goal to construct an ultra low latency system that has an extremely short response time to the extent that a user is unable to notice even in the case that the tactility information which is mostly sensitive to the delay time among five senses of a human is provided through an internet (target delay: E2E or Radio 1 ms).

Particularly, since the service that requires such an ultra low latency requires a data transmission without an error in addition to the delay, it is also requested to minimize the delay for a retransmission together.

In the current LTE system, the maximum retransmission number of HARQ is defined as 3. Generally, when three retransmissions are performed, it reaches the block error rate (BLER) of 10-x.

In the case of the LTE HARQ, a resource is allocated with taking BLER being 10-1 as the performance target in once transmission.

As such, the HARQ retransmission delay that occurs to satisfy the BLER provided in the current LTE system is as follows.

Downlink: Asynchronous HARQ

Retransmission delay: In the case that the maximum retransmission number is 3, assuming that the scheduling delay of an eNB is fixed as N ms, the delay of (13+3N) ms may occur. That is, in the case that an eNB retransmits data after 3 ms when receiving NACK in every time, the total retransmission delay becomes 22 ms.

Uplink: Synchronous HARQ

Retransmission delay: In the case that the maximum retransmission number is 3, the delay from a UL grant reception to the last retransmission of data is 29 ms.

In the case of downlink data that uses Asynchronous HARQ scheme, the delay of minimum 16 ms to maximum 25 ms may occur depending on the scheduling time of an eNB. However, in the case of downlink data that uses Synchronous HARQ scheme, the delay of 29 ms may occur.

Here, the factors that cause the retransmission delay of HARQ may be divided into two cases largely as follows.

ACK/NACK transmission delay (applicable to both of DL/UL)

Retransmission data transmission delay (applicable to UL)

In the case of downlink HARQ, by transmitting ACK/NACK fast, total retransmission delay may be further decreased.

In addition, in the case of uplink HARQ, by decreasing the transmission delay of retransmission data as well as the ACK/NACK transmission, the retransmission delay of entire data may be decreased.

However, according to the conventional LTE technique, the time delay described above cannot be decreased owing to reasons 1 and 2 below.

ACK/NACK transmission delay (applicable to both of DL/UL)

Data Buffering/Decoding Time

: takes 2 to 3 ms (the decoding time considering the maximum packet size transmittable)

Retransmission data transmission delay (applicable to UL)

Data Scheduling Time

: for UL, the resource throughout n–4$^{th}$ subframe to n$^{th}$ subframe is allocated.

: times when the time for preparing data transmitted by a UE is fully considered through a UL grant reception, and takes less than maximum 3 ms.

: since UL data is to be transmitted in advance as much as a Timing Advanced value for the UL synchronization with an eNB, the TA time should be considered.

FIG. 22 illustrates an example of a processing time.

FIG. 22*a* illustrates an example of a UE processing time for a UL data transmission, and FIG. 22*b* illustrates an example of a UE processing time for a DL data reception.

Here, the processing time is referred to as a time required for decoding received information and encoding information to be transmitted, and may also include a time for performing other process in addition to decoding and encoding times.

Hereinafter, a fast retransmission method of UL data for supporting 5G low latency radio (LLR) service proposed in the present disclosure is described.

The present disclosure newly defines a simple UL grant format for supporting fast retransmission of uplink data.

The simple UL grant is transmitted through Downlink Control Information (DCI), and the simple UL grant format may be defined as new DCI format 0A.

FIG. 23 illustrates an example of the simple UL grant format proposed in the present disclosure.

As shown in FIG. 23, the simple UL grant format newly defined for a fast retransmission of uplink data includes a subframe offset (SF_offset) field 2310, a HARQ processing ID (HARQ PID) field 2320 and a RBSTART field 2330 that represents a starting resource block (RB) index of UL data resource allocation.

The simple UL grant format represents a control message identifying a physical position of UL data transmission resource only.

That is, a UE generates a Transport Block already in an initial UL data transmission, and performs a retransmission of UL data by minimizing processing delay by mapping the data generated in a buffer to physical resource indicated by the simple UL grant only in the case that the retransmission is requested.

In addition, using the simple UL grant, the UL HARQ process is able to be performed in asynchronous method.

In this case, it is required to notify that the simple UL grant is retransmission resource allocation information for which HARQ process ID.

Each field of FIG. 23 will be described in more detail.

First, the SF_offset field (n bits, n is a natural number) 2310 is a value that signifies an SF offset from a subframe (SF) on which an eNB transmits the simple UL grant to a UE.

The SF_offset field may have lengths of cases 1 and 2 below depending on a transmission time interval (TTI) and a UE processing time. The lengths of cases 1 and 2 are just examples, but the SF_offset field may have a variety of lengths according to a system environment.

That is, the SF_offset field value represents the resource allocation how far the SF is located from the SF on which the simple UL grant is transmitted.

1. Definition of SF_offset of 1 bit length, in the case of an LTF frame structure of 1 TTI 0b0: a resource allocation for n+2$^{th}$ SF
0b1: a resource allocation for n+3$^{th}$ SF
2. Definition of SF_offset of 2 bit length, in the case of an LTF frame structure of 0.2 TTI
0b00: a resource allocation for n+2$^{th}$ SF
0b01: a resource allocation for n+3$^{th}$ SF
0b10: a resource allocation for n+4$^{th}$ SF
0b11: reserved Herein, n represents the number of SF on which the simple UL grant is transmitted.

Next, the RBSTART (n bits, n is a natural number) field 2330 is a parameter or information that represents a starting resource block (RB) index of UL data resource allocation, and the RBSTART field having lengths of cases 1 and 2 below depending on a bandwidth.

1. The RB structure used in LTE is used as it is (refer to Table 7)
1.4 MHz: 3 bits
3 MHz: 4 bits
5 MHz: 5 bits
10 MHz: 6 bits
15/20 MHz: 7 bits Table 7 represents the number of transmission bandwidth configuration RB in E-UTRA channel bandwidths.

TABLE 7

| | Channel bandwidth BWChannel [MHz] | | | | |
|---|---|---|---|---|---|
| | 1.4 | 3 | 5 | 10 | 15 | 20 |
| Transmission bandwidth configuration NRB | 6 | 15 | 25 | 50 | 75 | 100 |

In the case that a new RB structure is used in a future 5G communication system, the number of RBs for each bandwidth may be changed according to the corresponding system, and accordingly, a length of the starting resource block (RB) index of UL data may also be applied.

Next, the HARQ process ID (n bits, n is a natural number) field 2320 represents a HARQ process ID (HARQ PID) that corresponds to the data transmitted through an allocated resource.

In the case of the LTE system, since 8 HARQ processes are used, the HARQ process ID field of 3 bit length is defined.

The length of the HARQ PID field may be changed according to a HARQ process. For example, in the case that 10 HARQ processes are used, the length of the HARQ PID may be defined as 4 bits.

FIG. 24 illustrates another example of the simple UL grant format proposed in the present disclosure.

The simple UL grant format shown in FIG. 24 further includes a redundancy version (RV) field 2410 that represents a redundancy version for the HARQ of incremental redundancy (IR) scheme in addition to the fields described in FIG. 23 (the SF_offset field, the HARQ PID field, the RV field and the RBSTART field).

FIG. 25 is a flowchart illustrating an example of a fast retransmission method of UL data proposed in the present disclosure.

That is, in order to perform the fast retransmission of UL transmission by a low latency radio UE, the resource allocation for retransmission data uses the simple UL grant proposed in the present disclosure described above.

The fast retransmission method of UL data proposed in the present disclosure includes (1) a step of receiving a UL grant for an initial data transmission (step, S2510), (2) a step of receiving the simple UL grant together with NACK (step, S2530) and (3) a step of retransmitting data through the simple UL grant (step, S2540), largely.

With reference to FIG. 25, each of steps (1) to (3) will be described in detail.

(1) UL Grant Reception for an Initial Data Transmission

The UL grant of an eNB for an initial UL data transmission of a UE is allocated in n$^{th}$ subframe using DCI format 0 (step, S2510).

This means a resource allocation for the UL data to be transmitted in n+4$^{th}$ subframe As another embodiment, the UL grant of an eNB for an initial UL data transmission of a UE may also use the simple UL grant format described above. The detailed description for the simple UL grant format is referred to FIG. 23 and FIG. 24. In addition, the detailed method for another embodiment will be described below with reference to FIG. 27 and FIG. 28.

(2) NACK and the Simple UL Grant Reception

When an eNB determines an error for the initial UL data transmission of a UE (step, S2520), the eNB transmits NACK to the UE through a PHICH (step, S2530).

Here, when the UE is a low latency radio (LLR) UE, the eNB transmits the simple UL grant to the UE together with the NACK transmission (step, S2530).

As described in FIG. 23 and FIG. 24, the simple UL grant represents a control message that includes the subframe_offset field, the RB START field and the HARQ process ID (HARQ PID) field, or includes the subframe_offset field, the RB START field and the HARQ process ID (HARQ PID) field and the RV field.

The (LLR) UE that receives NACK through the PHICH from the eNB decodes the simple UL grant transmitted to the UE itself.

The simple UL grant should be transmitted through the same subframe as the subframe on which NACK is transmitted.

Later, the UE that receives the simple UL grant retransmits the data block which is the same as that of the initial UL data transmission.

Here, the physical resource size of the retransmitted data by the UE is the same as that of the initial data transmission.

In addition, depending on whether the retransmission scheme of data retransmitted is the chase combining (CC) or the incremental redundancy (IR), the redundancy version for the transmission to the eNB may be the same or different.

For example, in the case that the UE performs the HARQ operation through the IR scheme, the following two RV mapping methods may be defined.

Implicit signaling: The RV is transmitted in a predetermined order. For example, the RVs 2, 0, 1 and 3 may be transmitted in the order.

Explicit signaling: The RV field (or parameter) of 2 bit length representing the RV may be defined in the simple UL grant format described above and transmitted. The detailed description is referred to the description above.

(3) Fast Data Retransmission

Through method (2) described above, the UE that receives the simple UL grant together with NACK for an initial transmission from the eNB directly transmits retransmission UL data to the eNB by mapping the data block stored in its own HARQ buffer to the physical resource position provided by the simple UL grant as soon as receiving the corresponding control information (or as soon as decoding the corresponding control information) (step, S2540).

The control information may mean NACK and the simple UL grant or the simple UL grant only.

That is, the UE that receives the simple UL grant from the eNB may decrease the overall retransmission delay of UL data by fast-transmitting the retransmission data block to the eNB.

The entire procedure for a UE to perform the fast transmission of UL data using each of methods (1) to (3) described above will be described in more detail with reference to FIG. 26.

FIG. 26 is a diagram illustrating an example of a fast retransmission method of UL data using the simple UL grant format proposed in the present disclosure.

That is, an eNB may allocate resource for UL data to a UE as shown in FIG. 26.

The corresponding method may be used with the method of allocating the resource for the UL data to be transmitted in the existing $n-4^{th}$ subframe to $n^{th}$ subframe.

Accordingly, the eNB may know the resource information already allocated on $n-3^{th}$ to $n-1^{th}$ subframes, and based on it, may allocate a resource using the simple UL grant format for fast-retransmitting the UL data of the LLR UE in the resource region which is not allocated (or available resource region).

FIG. 26 illustrates an example of the case that the channel bandwidth is 1.4 MHz and the number of RB (NRB) is 6.

In the case that an eNB has no resource to allocate to an LLR UE in $n-3^{th}$ to $n-1^{th}$ subframes, by transmitting the existing UL grant (in the case that resource information is required to be amended), a UE is able to transmit data in $n+4^{th}$ subframe.

The method of transmitting the existing UL grant may be omitted (in the case that an eNB has no resource to allocate to an LLR UE in $n-3^{th}$ to $n-1^{th}$ subframes). In the case that the corresponding method is omitted, the UE may implicitly know that the UL data is able to be transmitted through the same physical resource using the same control information as that of an initial transmission.

This will be described in more detail with reference to FIG. 26.

As shown in FIG. 26, in the case of UL, an SF boundary of an LLR UE is located in front of the SF boundary of an eNB as much as a TA.

First, the LLR UE transmits a scheduling request to the eNB in order to be allocated with a UL grant (step, S2610).

Later, the eNB transmits a UL grant (SF#8 UL grant) in order to allocate resource for a UL data transmission of the $n=8^{th}$ SF in the $n=4^{th}$ subframe (SF) (step, S2620).

Then, the LLR UE transmits UL data to the eNB in the $n=8^{th}$ SF (step, S2630).

The eNB may allocate resource in $n=10^{th}$ SF for other UE(s) able to transmit UL data in $n=14^{th}$ SF (SF#14 UL grant). That is, it is seen that there is a resource allocation for other UE(s) in $3^{rd}$, $4^{th}$ and $6^{th}$ RBs among PUSCH RSs in FIG. 26 (2610).

Later, in the case that the eNB fails to decode for the UL data transmission of the LLR UE in step S2630, the eNB transmits the simple UL grant (S_UL grant) while transmitting NACK to the LLR UE simultaneously (in order to allocate resource for the fast retransmission) (step, S2640).

The S_UL grant format 2620 in step S2640 includes the information that represents SF_offset=0, HARQ PID=#2, RBstart=5.

Accordingly, the LLR UE that receives the S_UL grant in step S2640 retransmits the UL data that corresponds to HARQ Process #2 through $5^{th}$ RB (among PUSCH RBs) of SF ($n=14^{th}$ SF) which is 2 times later than the SF ($n=12^{th}$ SF) for transmitting the S_UL grant (step, S2650).

That is, the eNB allocates resource to the $5^{th}$ RB by avoiding $3^{rd}$, $4^{th}$ and $6^{th}$ RB resources allocated to other UE(s) for the LLR UE.

Through the S_UL grant, the processing time (decoding time) of the LLR UE decreases.

Later, the eNB performs a resource allocation in $n=16^{th}$ SF such that other UE(s) is able to transmit UL data in $n=20^{th}$ SF (SF#20 UL grant, step, S2660).

That is, it is seen that there is the resource allocation for other UE(s) in the $1^{st}$, $4^{th}$, $5^{th}$ and $6^{th}$ RBs among PUSCH RBs in FIG. 26 (2630).

Later, in the case that the eNB fails to decode for the retransmission data of the LLR UE in step S2650, the eNB transmits the simple UL grant (S_UL grant) to the LLR UE while transmitting NACK to the LLR UE simultaneously (in order to allocate resource for the fast retransmission) (step, S2670).

The S_UL grant format 2640 in step S2670 includes the information that represents SF_offset=0, HARQ PID=#2, RBstart=3.

Accordingly, the LLR UE that receives the S_UL grant in step S2670 retransmits the UL data that corresponds to HARQ Process #2 through $3^{rd}$ RB (among PUSCH RBs) of SF ($n=20^{th}$ SF) which is 2 times later than the SF ($n=18^{th}$ SF) for transmitting the S_UL grant (step, S2680).

A Method of Applying the Simple UL Grant to an Initial Data Transmission

As another embodiment proposed in the present disclosure, a method of utilizing the simple UL grant for an initial data transmission as well as the retransmission of UL data will be described with reference to FIG. 27 and FIG. 28.

FIGS. 27 and 28 are diagrams illustrating a method for transmitting initial data of a UE using the simple UL grant format proposed in the present disclosure.

That is, for the data of fixed size generated from a specific service application, the simple UL grant may be applied as a way to decrease data transmission delay in the initial transmission in addition to the retransmission.

This may be applied to the case that an eNB detects it is a resource request of a specific LLR UE through a predetermined method.

As an example, the UE may notify it is a resource request for data of fixed size to the eNB through an SR or using additional control information.

Through this, the eNB may detect a processing time of the UE. After determining a transmission time of the S_UL grant to the UE by considering the processing time, the eNB transmits the S_UL grant to the UE.

In this case, the data of fixed size generated is defined in the state that all of the data are encoded in the UE and waiting for being mapped to physical resources between intervals from the resource request through the SR of the UE to the time of receiving the simple UL grant from the eNB.

FIG. 27 is a diagram illustrating an initial data transmission method of a UE using the simple UL grant for general UL data, and FIG. 28 a diagram illustrating an initial data transmission method of a UE using the simple UL grant for data of fixed size.

That is, in the case that UL data of fixed size are generated from a specific service application, first, the LLR UE starts to process according to predetermined resource information with respect to the data of fixed size that is going to be transmitted by itself while transmitting an SR to the eNB.

The predetermined resource information may represent the resource information required for data encoding such as MCS information, TB size, and the like.

Here, for the convenience of description, it is assumed that the processing time of the UE for the general UL data takes about 5 ms (2710, FIG. 27) and the processing time of the UE for the UL data of fixed size takes about 3 ms (2810, FIG. 28).

That is, as shown in FIG. 28, the LLR UE that transmits an SR may receive the simple UL grant from the eNB more quickly than the case of FIG. 27 by starting the processing according to the predetermined information for the UL data to be transmitted from the time of transmitting the SR. And, by fast-transmitting initial data through the simple UL grant, the entire transmission time of the initial data may be decreased.

FIGS. 29 to 31 are diagrams illustrating a retransmission delay time compared with the conventional method when using the simple UL grant format proposed in the present disclosure.

Through FIGS. 29 to 31, what amount of data transmission delay decreased is seen in comparison with the conventional method in the case of retransmitting data using the simple UL grant and the case of performing an initial data transmission and a data retransmission using the simple UL grant.

That is, FIGS. 29 to 31 show the entire time from the time when a UE transmits initial UL data to the time for performing the retransmission for UL data three times.

FIG. 29 illustrates a UL data transmission method using the conventional method, FIG. 30 illustrates a method for performing a UL data retransmission using the simple UL grant, and FIG. 31 illustrates a method for performing an initial UL data transmission and a UL data retransmission using the simple UL grant.

That is, FIG. 30 shows a method of decreasing retransmission delay of UL data and FIG. 31 shows a method of decreasing both of the initial transmission of UL data and the retransmission delay.

In the case of transmitting UL data through the conventional method, it is seen that time delay of total 33 ms occurs (FIG. 29). In the case of performing a retransmission using the simple UL grant, it is seen that time delay of total 27 ms occurs (FIG. 30). In the case of performing both of an initial transmission and a retransmission using the simple UL grant, it is seen that time delay of total 23 ms occurs (FIG. 31).

That is, in the case of transmitting UL data using the simple UL grant newly defined in the present disclosure, it can be seen that there is an effect of decreasing the retransmission delay as much as minimum 1 TTI (in the case that SF_offset #1 is allowed only for a single retransmission) and maximum 10 TTI (or 10 ms, 10 SF).

General Apparatus to which the Present Invention May be Applied

FIG. 32 illustrates a block diagram of a wireless communication apparatus to which the methods proposed in the present disclosure may be applied.

Referring to FIG. 32, the wireless communication system includes a base station (eNB) 3210 and a plurality of user equipments (UEs) 3220 located within the region of the eNB 3210.

The eNB 3210 includes a processor 3211, a memory 3212 and a radio frequency unit 3213. The processor 3211 implements the functions, processes and/or methods proposed in FIGS. 1 to 31 above. The layers of wireless interface protocol may be implemented by the processor 3211. The memory 3212 is connected to the processor 3211, and stores various types of information for driving the processor 3211. The RF unit 3213 is connected to the processor 3211, and transmits and/or receives radio signals.

The UE 3220 includes a processor 3221, a memory 3222 and an RF unit 3223. The processor 3221 implements the functions, processes and/or methods proposed in FIGS. 1 to 31 above. The layers of wireless interface protocol may be implemented by the processor 3221. The memory 3222 is connected to the processor 3221, and stores various types of information for driving the processor 3221. The RF unit 3223 is connected to the processor 3221, and transmits and/or receives radio signals.

The memories 3212 and 3222 may be located interior or exterior of the processors 3211 and 3221, and may be connected to the processors 3211 and 3221 with well known means. In addition, the eNB 3210 and/or the UE 3220 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting uplink data in a wireless communication system of the present invention has been described mainly with the example applied to 3GPP LTE/LTE-A system, but may also be applied to various wireless communication systems except the 3GPP LTE/LTE-A system.

What is claimed is:

1. A method for transmitting, by a user equipment (UE), uplink (UL) data in a wireless communication system that supports a low latency system, the method comprising:
    receiving, from a base station, a first UL grant for initial data
    transmitting, to the base station, the initial data based on the first UL grant;
    generating a transport block related to a retransmission of the initial data;
    receiving, from the base station, a negative acknowledgement (NACK) for the initial data and a second UL grant,
        wherein the second UL grant includes a position of a physical resource for the transport block;
    mapping the transport block to the position of the physical resource based on the second UL grant; and
    transmitting, to the base station, the transport block on the physical resource.

2. The method of claim 1,
    wherein the second UL grant further includes at least one of a subframe offset (SF_offset) field representing a subframe (SF) offset from a SF on which the base station transmits the second UL grant, a hybrid automatic repeat request (HARQ) process ID (HARQ PID) field representing a HARQ process ID that corresponds to retransmission data, a RBSTART field representing an index of a resource allocation start resource of the transport block or a redundancy version (RV) field representing a version of redundancy in HARQ of incremental redundancy scheme.

3. The method of claim 1, wherein the NACK is received through a Physical Hybrid-ARQ Indicator Channel (PHICH), and
    wherein the second UL grant is received through a Physical Downlink Control Channel (PDCCH).

4. The method of claim 1, wherein when the initial data is data having a fixed size, a first format of the first UL grant is same as a second format of the second UL grant.

5. The method of claim 4, further comprising transmitting, to the base station, control information representing whether the initial data is general data or data of a fixed size.

6. The method of claim 5, wherein the control information is transmitted to the base station through a scheduling request (SR).

7. A method for transmitting, by a base station, uplink (UL) data in a wireless communication system that supports a low latency system, the method comprising:
    transmitting, to a user equipment (UE), a first UL grant for initial data;
    receiving, from the UE, the initial data;
    transmitting, to the UE, a second UL grant and a negative acknowledgement (NACK), when decoding of the received initial data is failed,
        wherein the second UL grant includes a position of a physical resource for a transport block related to a retransmission of the initial data; and
    receiving, from the UE, the transport block on the physical resource.

8. The method of claim 7, wherein the second UL grant further includes at least one of a subframe offset (SF_offset) field representing a subframe (SF) offset from a SF for transmitting the second UL grant to the UE, a hybrid automatic repeat request (HARQ) process ID (HARQ PID) field representing a HARQ process ID that corresponds to retransmission data, a RBSTART field representing an index of a resource allocation start resource of the transport block or a redundancy version (RV) field representing a version of redundancy in HARQ of incremental redundancy scheme.

9. The method of claim 7, wherein the NACK is transmitted through a Physical Hybrid-ARQ Indicator Channel (PHICH), and
    wherein the second UL grant is transmitted through a Physical Downlink Control Channel (PDCCH).

10. The method of claim 7, wherein when the initial data is data having a fixed size, a first format of the first UL grant is same as a second format of the second UL grant.

11. The method of claim 10, further comprising receiving control information representing whether the initial data is general data or data of a fixed size.

12. The method of claim 11, wherein the control information is transmitted to the base station through a scheduling request (SR).

13. A user equipment (UE) transmitting uplink (UL) data in a wireless communication system that supports a low latency system, the UE comprising:
    a radio frequency (RF) unit for transmitting and receiving a radio signal; and
    a processor functionally connected to the RF unit,
    wherein the processor is configured to perform:
    receiving, from a base station, a first UL grant for initial data;
    transmitting, to the base station, the initial data based on the first UL grant;
    generating a transport block related to a retransmission of the initial data;
    receiving, from the base station, a negative acknowledgement (NACK) for the initial data and a second UL grant,
        wherein the second UL grant includes a position of a physical resource for the transport block;
    mapping the transport block to the position of the physical resource based on the second UL grant; and
    transmitting, to the base station, the transport block on the physical resource.

* * * * *